US008289567B2

(12) United States Patent
Ouchi

(10) Patent No.: US 8,289,567 B2
(45) Date of Patent: Oct. 16, 2012

(54) IMAGE RECORDING APPARATUS THAT PERFORMS BORDERLESS RECORDING

(75) Inventor: Tetsuya Ouchi, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 1265 days.

(21) Appl. No.: 12/021,898

(22) Filed: Jan. 29, 2008

(65) Prior Publication Data

US 2008/0180708 A1 Jul. 31, 2008

(30) Foreign Application Priority Data

Jan. 31, 2007 (JP) ................................ 2007-022510

(51) Int. Cl.
*G06K 15/02* (2006.01)

(52) U.S. Cl. ............ 358/1.2; 358/1.1; 358/1.8; 358/1.9; 358/1.13; 358/1.15; 358/1.18; 347/9

(58) Field of Classification Search ....................... None
See application file for complete search history.

(56) References Cited

U.S. PATENT DOCUMENTS

| | | | | |
|---|---|---|---|---|
| 6,840,691 | B2 | 1/2005 | Isono et al. | |
| 7,018,009 | B2 | 3/2006 | Isono et al. | |
| 7,065,261 | B1 * | 6/2006 | Horie | 382/289 |
| 7,651,188 | B2 * | 1/2010 | Otsuki | 347/19 |
| 2002/0027672 | A1 * | 3/2002 | Horie | 358/1.12 |
| 2006/0033943 | A1 * | 2/2006 | Yanagi | 358/1.13 |
| 2006/0039020 | A1 * | 2/2006 | Sasaki | 358/1.13 |
| 2006/0077242 | A1 * | 4/2006 | Takeishi et al. | 347/101 |

FOREIGN PATENT DOCUMENTS

| | | | |
|---|---|---|---|
| JP | 2001026148 | A | 1/2001 |
| JP | 2002103586 | A | 4/2002 |
| JP | 2003112416 | A | 4/2003 |
| JP | 200510239 | A | 1/2005 |
| JP | 200516977 | A | 1/2005 |
| JP | 200522210 | A | 1/2005 |
| JP | 2005081687 | A | 3/2005 |

* cited by examiner

*Primary Examiner* — Marivelisse Santiago Cordero
*Assistant Examiner* — Miya J Cato
(74) *Attorney, Agent, or Firm* — Baker Botts L.L.P.

(57) ABSTRACT

An image recording apparatus includes an acquiring section, a recording section, and a width setting section. The acquiring section acquires print data indicative of an image having a size including a recording surface of a recording medium. The recording section records a borderless image on the recording medium based on the print data while the recording medium is conveyed in a conveying direction. The recording medium has an upstream side and a downstream side with respect to the conveying direction. The width setting section sets width of the image in a widthwise direction perpendicular to the conveying direction. The width of the image increases from the downstream side toward the upstream side in the conveying direction.

17 Claims, 23 Drawing Sheets

FIG.21A

111

| SIZE OF RECORDING SHEET | COEFFICIENT A |
|---|---|
| LETTER | 1.1 |
| LEGAL | 1.2 |
| A4 | 1 |
| B5 | 1 |
| A5 | 1 |
| POSTCARD | 1 |
| L-SIZE | 1 |

FIG.21B

112

| IMAGE TYPE | COEFFICIENT B |
|---|---|
| PHOTOGRAPH | 1.1 |
| TEXT | 1 |

FIG.21C

113

| TYPE OF RECORDING SHEET | COEFFICIENT C |
|---|---|
| PLAIN PAPER | 1 |
| INKJET PAPER | 1.1 |
| GLOSSY PAPER | 1.2 |

FIG.21D

114

| RESOLUTION | COEFFICIENT D |
|---|---|
| LOW RESOLUTION | 1 |
| HIGH RESOLUTION | 1.1 |

FIG.21E

115

| CONVEYING AMOUNT | COEFFICIENT E |
|---|---|
| 0~5 cm | 1 |
| 5~10 cm | 1.02 |
| 10~15 cm | 1.05 |
| 15~20 cm | 1.07 |
| 20~25 cm | 1.10 |
| 25~30 cm | 1.12 |
| 30 cm ~ | 1.15 |

IMAGE RECORDING APPARATUS THAT PERFORMS BORDERLESS RECORDING

CROSS REFERENCE TO RELATED APPLICATIONS

This application claims priority from Japanese Patent Application No. 2007-022510 filed Jan. 31, 2007. The entire content of the priority application is incorporated herein by reference.

TECHNICAL FIELD

This invention relates to an image recording apparatus that performs borderless recording on a recording medium, a method for recording an image, a program for controlling an image recording apparatus, and a printer driver that is installed in a computer for transferring print data to an image recording apparatus.

BACKGROUND

Known image recording apparatuses include those provided with a functional feature of printing a borderless image on the entire surface of a recording sheet according to print data (borderless recording or borderless printing). Borderless recording is a printing process in which a region where an image is to be recorded on a recording sheet is set to be larger than a recording area of the recording sheet and ink is ejected to an area including the outside of the recording sheet.

A dot recording apparatus as described in Japanese Patent Application Publication No. 2002-103586 has a platen extending in the moving direction of the recording head of the apparatus. The platen is arranged at a position in confrontation with the recording head of the apparatus with the conveying path, along which a recording sheet is conveyed, and which is interposed between the platen and the head. A groove is formed on part of the upper surface of the platen so as to extend in the moving direction of the recording head. The groove is arranged at a position in confrontation with part of nozzles of the recording head. An absorbent member is arranged on the bottom of the groove. Part of the nozzles of the recording head is employed when the dot recording apparatus is operated for borderless recording. As described above, a groove is formed in the platen that is located in confrontation with the part of the nozzles. Since the ink that does not hit the recording sheet is absorbed by the absorbent member, the ink is prevented from adhering to the upper surface of the platen in the borderless recording operation.

Japanese Patent Application Publication No. 2001-26148 discloses an information processing terminal for generating print data for borderless recording. The information processing terminal generates print data for borderless recording of a size that includes the recording surface of a recording sheet that is used in a printing apparatus and transmits the print data to the printing apparatus.

Japanese Patent Application Publication No. 2005-10239 describes a laser printer provided with a contact image sensor (CIS) for detecting the recording sheet on the conveying path for conveying recording sheets. The laser printer uses detection results of the CIS to detect the positions of the front edge and the side edges of the recording sheet and the extent of obliqueness of the recording sheet and to control the operation of forming an image on the photosensitive belt of the apparatus by means of a laser beam.

Japanese Patent Application Publication No. 2005-81687 describes an inkjet recording apparatus having a carriage that is provided with a recording head mounted thereon and a photosensor. The photosensor includes a light emitting element for irradiating light onto the conveying path of recording sheets and a light receiving element for detecting reflected light. The inkjet recording apparatus determines whether the object located below the recording head is a recording sheet or the platen according to the quantity of light detected by the light receiving element. Then, the inkjet recording apparatus allows ejection of ink onto a region where a recording sheet exists but prohibits ejection of ink onto a region where a recording sheet does not exist. With this configuration, when the recording sheet moves obliquely, the apparatus prevents ink from being wasted.

Japanese Patent Application Publication No. 2005-169777 discloses a printing control apparatus that processes image data inputted to the printing control apparatus so as to enlarge the size of the image of the image data by resolution conversion and generates print data for borderless recording. The printing control apparatus partitions the image of the image data into a central region and a peripheral region. Then, the printing control apparatus processes the pixel data corresponding to the central region so as not to enlarge the size of the image of the central region but processes the pixel data corresponding to the peripheral region so as to enlarge the size of the image of the peripheral region. Thus, since only the pixel data of the image data that correspond to the peripheral region are processed for enlargement, the image of an object is prevented from being deteriorated when the apparatus generates print data for borderless recording.

Japanese Patent Application Publication No. 2005-22210 describes a recording apparatus having a carriage designed to reciprocate in a direction orthogonal to a conveying direction along which recording sheets are conveyed. The carriage is provided with a recording head for ejecting ink onto a recording sheet and a sheet detecting sensor for detecting a recording sheet. For borderless recording, the sheet detecting sensor detects the positions of the side edges of the recording sheet in a main scanning direction. Then, the recording apparatus determines a starting position for the recording head to start ejecting ink and an ending position for the recording head to end ejecting ink in the main scanning direction based on the detected positions of the side edges. When the recording sheet is detected to be moving obliquely by the sheet detecting sensor, the starting position and the ending position are extended outwardly in the main scanning direction.

U.S. Pat. Nos. 6,840,691 and 7,018,009 (corresponding to Japanese Patent Application Publication No. 2003-112416) disclose a technique of recording an image by ejecting ink from part of the nozzles of the recording head for an upstream end part and a downstream end part of a recording sheet in a conveying direction and ejecting ink from all the nozzles of the recording head for the remaining region of the recording sheet.

SUMMARY

When the recording sheet moves obliquely for borderless recording, there is a problem that no image is recorded on a region of the recording sheet if an image recording apparatus has no sensor for detecting a recording sheet that is conveyed obliquely. There is also a problem that the overall structure of a conventional image recording apparatus becomes complex to raise the manufacturing cost when the image recording apparatus is provided with a sensor for detecting a recording sheet that is conveyed obliquely.

Another problem of conventional image recording apparatus is that the region where ink is wasted increases, if a region on which an image is recorded on a recording sheet is simply expanded for borderless recording. Hence, there arises a problem that wasted ink can stain the platen and ink mist can occur at an increased rate.

In view of the foregoing, it is an object of the invention to provide an image recording apparatus, a method for recording an image, a program for controlling an image recording apparatus, and a printer driver that can prevent any unprinted region from being produced on an recording medium when borderless recording is performed according to print data without requiring a sensor for detecting an recording medium that is conveyed obliquely and that can prevent wasting of ink.

In order to attain the above and other objects, the invention provides an image recording apparatus. The image recording apparatus includes an acquiring section, a recording section, and a width setting section. The acquiring section acquires print data indicative of an image having a size including a recording surface of a recording medium. The recording section records a borderless image on the recording medium based on the print data while the recording medium is conveyed in a conveying direction. The recording medium has an upstream side and a downstream side with respect to the conveying direction. The width setting section sets width of the image in a widthwise direction perpendicular to the conveying direction. The width of the image increases from the downstream side toward the upstream side in the conveying direction.

According to another aspect, the invention also provides a method for recording an image. The method includes: acquiring print data indicative of an image having a size including a recording surface of a recording medium, the recording medium having an upstream side and a downstream side with respect to a conveying direction; setting width of the image in a widthwise direction perpendicular to the conveying direction in such a manner that the width of the image increases from the downstream side toward the upstream side in the conveying direction, thereby modifying the print data; and recording a borderless image on the recording medium based on the print data modified in the setting step, while the recording medium is conveyed in the conveying direction.

According to still another aspect, the invention also provides a computer readable product storing a set of program instructions executable on an image recording apparatus. The set of program instructions includes: acquiring print data indicative of an image having a size including a recording surface of a recording medium, the recording medium having an upstream side and a downstream side with respect to a conveying direction; setting width of the image in a widthwise direction perpendicular to the conveying direction in such a manner that the width of the image increases from the downstream side toward the upstream side in the conveying direction, thereby modifying the print data; and recording a borderless image on the recording medium based on the print data modified in the setting step, while the recording medium is conveyed in the conveying direction.

According to still another aspect, the invention also provides a computer readable product storing a printer driver including a set of program instructions executable on a computer. The set of program instructions includes: transferring print data to an image forming apparatus capable of performing a borderless recording on a recording medium; generating image data indicative of an image having a size including a recording surface of the recording medium; replacing pixel data corresponding to both ends of the image in a widthwise direction with pixel data indicative of blank, the widthwise direction being orthogonal to a conveying direction in which the recording medium is conveyed; and decreasing a number of pixels that is replaced by the replacing instructions from the downstream side toward the upstream side in the conveying direction.

BRIEF DESCRIPTION OF THE DRAWINGS

Embodiments in accordance with the invention will be described in detail with reference to the following figures wherein:

FIG. 21A shows a setting table storing sizes of recording sheets in association with corresponding respective values of coefficient A;

FIG. 21B shows a setting table storing types of image in association with corresponding respective values of coefficient B;

FIG. 21C shows a setting table storing types of recording sheet in association with corresponding respective values of coefficient C;

FIG. 21D shows a setting table storing resolutions in association with corresponding respective values of coefficient D;

FIG. 21E shows a setting table storing conveying amounts of recording sheet in association with corresponding respective values of coefficient E;

DETAILED DESCRIPTION

First Embodiment

An image recording apparatus according to a first embodiment of the invention will be described while referring to FIGS. 1 through 17. The image forming apparatus of the first embodiment is applied to a multifunction device.

Figure 1:
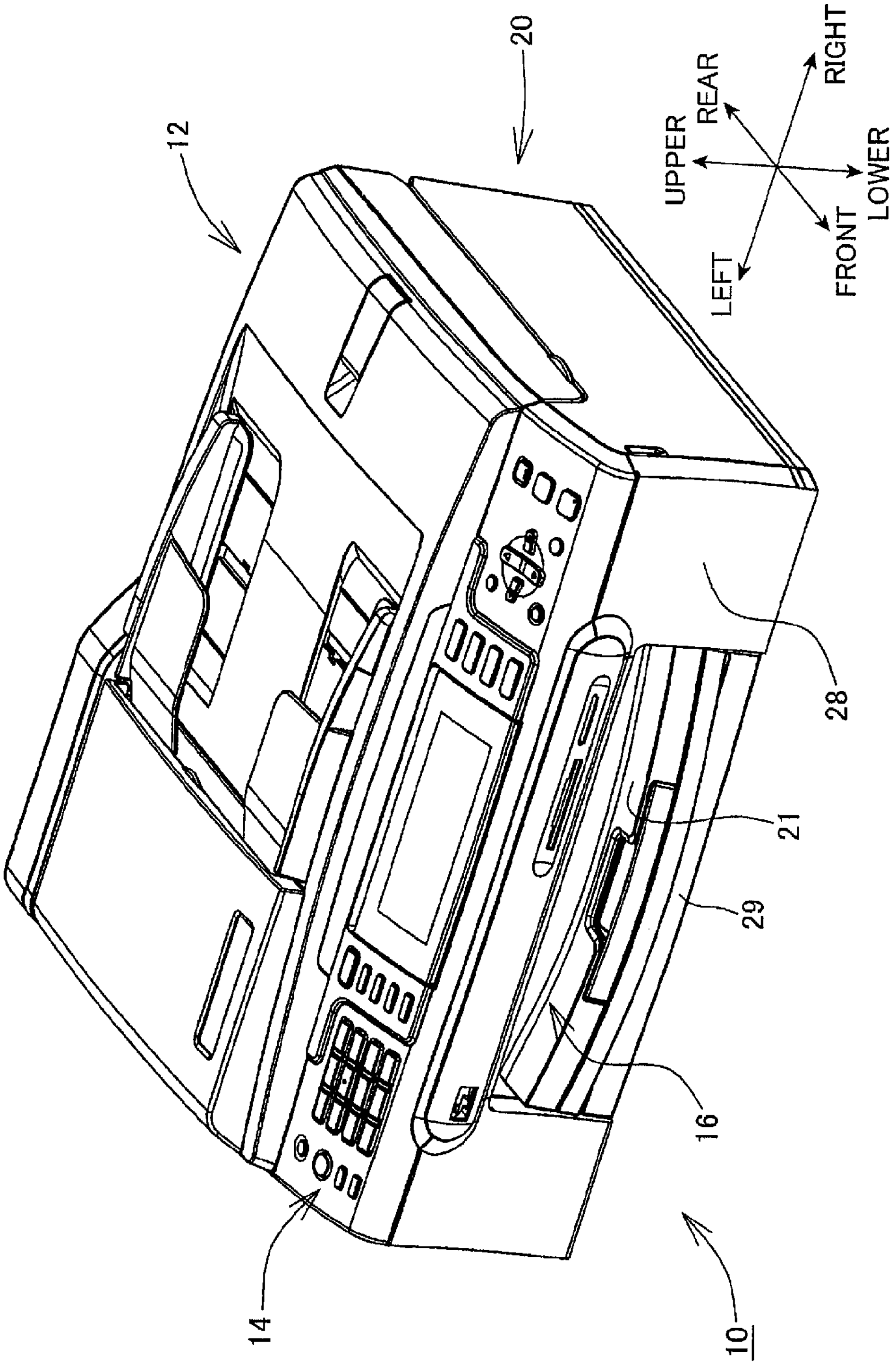
FIG. 1 is a perspective view of a multifunction device according to a first embodiment of the invention for showing the external configuration of the multifunction device.

FIG. 1 is a perspective view of a multifunction device (MFD) 10, showing the external configuration thereof.

In the following description, the expressions “front”, “rear”, “upper”, “lower”, “right”, and “left” are used to define the various parts when the multifunction device 10 is disposed in an orientation in which it is intended to be used.

As shown in FIG. 1, the multifunction device 10 has a scanner section 12 and a printer section 20 respectively in an upper part and in a lower part thereof. The multifunction device 10 has functions of a printer, a scanner, a copier, and a facsimile machine. The printer section 20 serves as an image recording apparatus. In other words, the functions other than a printer function are optional functions and hence the invention is applicable to a single function printer that does not have a scanner section and accordingly does not have a scanner or copier function.

The multifunction device 10 is connected to a terminal apparatus 70 (an example of a computer, see FIG. 9) and records an image on a recording sheet (an example of recording medium) according to the print data transferred (transmitted) from the terminal apparatus 70. Note that the multifunction device 10 has a function of recording a borderless image (borderless printing) on a recording sheet by ejecting ink to a region larger than a recording sheet according to print data. Additionally, the multifunction device 10 can be connected to a digital camera for printing an image of image data outputted from the digital camera on a recording sheet. Still additionally, the multifunction device 10 can be mounted with any of various known storage mediums such as a memory card and record an image of image data stored in the storage medium.

As shown in FIG. 1, the multifunction device 10 has a substantially rectangular parallelepiped shape having a width and a length greater than its height. The printer section 20 is provided with a front opening 16. A sheet-feeding tray 29 and a sheet-discharging tray 21 of the printer section 20 are arranged respectively on a lower level and on an upper level in the inside of the opening 16. Recording sheets are accommodated in the sheet-feeding tray 29. Sheets of paper that can be used for the multifunction device 10 include sheets of plain paper (ordinary paper), glossy paper, inkjet recording paper, post cards, and the like.

A door 28 is arranged at a lower right position of the front surface of the printer section 20 so as to be freely opened and closed. A cartridge mounting section (not shown) is arranged in the inside of the door 28. As the door 28 is opened, the cartridge mounting section is exposed to the front side so that an ink cartridge can be mounted and dismounted. As the ink cartridge is mounted in the cartridge mounting section, the ink cartridge is linked to a recording head 39 (see FIG. 7) by way of an ink tube 41 (see FIG. 4). The ink cartridge stores ink to be supplied to the recording head 39. The multifunction device 10 is adapted to use color inks of four different colors for recording images. Inks of four colors are cyan (C) ink, magenta (M) ink, yellow (Y) ink, which are dye ink, and black (Bk) ink, which is pigment ink. Therefore, four ink cartridges for ink of four colors are mounted in the cartridge mounting section. Note, however, the number of ink colors that can be used in the multifunction device 10 is not limited to four. For example, five ink colors including the above four ink colors and photoblack (PBk) ink, which is dye ink, may alternatively be used. A carriage 38 (see FIG. 4), which will be described in greater detail hereinafter, is provided with a subsidiary tank along with the recording head 39. The subsidiary tank stores the ink supplied from the ink cartridges. The recording head 39 records an image on a recording sheet by ejecting ink supplied from the subsidiary tank.

The scanner section 12 is provided at an upper part of the multifunction device 10. The scanner section 12 reads an image of an original (document). The scanner section 12 includes a flatbed scanner (FBS) and an automatic document feeder (ADF). Since the configuration of the scanner section 12 is known in the art, the scanner section 12 of this embodiment will not be described in greater detail. An operation panel 14 is arranged in an upper part of the front surface of the multifunction device 10. The operation panel 14 has a liquid crystal display that displays various information and input keys by which the user inputs information. The multifunction device 10 operates according to information transmitted from the terminal apparatus 70 or operation inputs sent from the operation panel 14.

Figure 2:
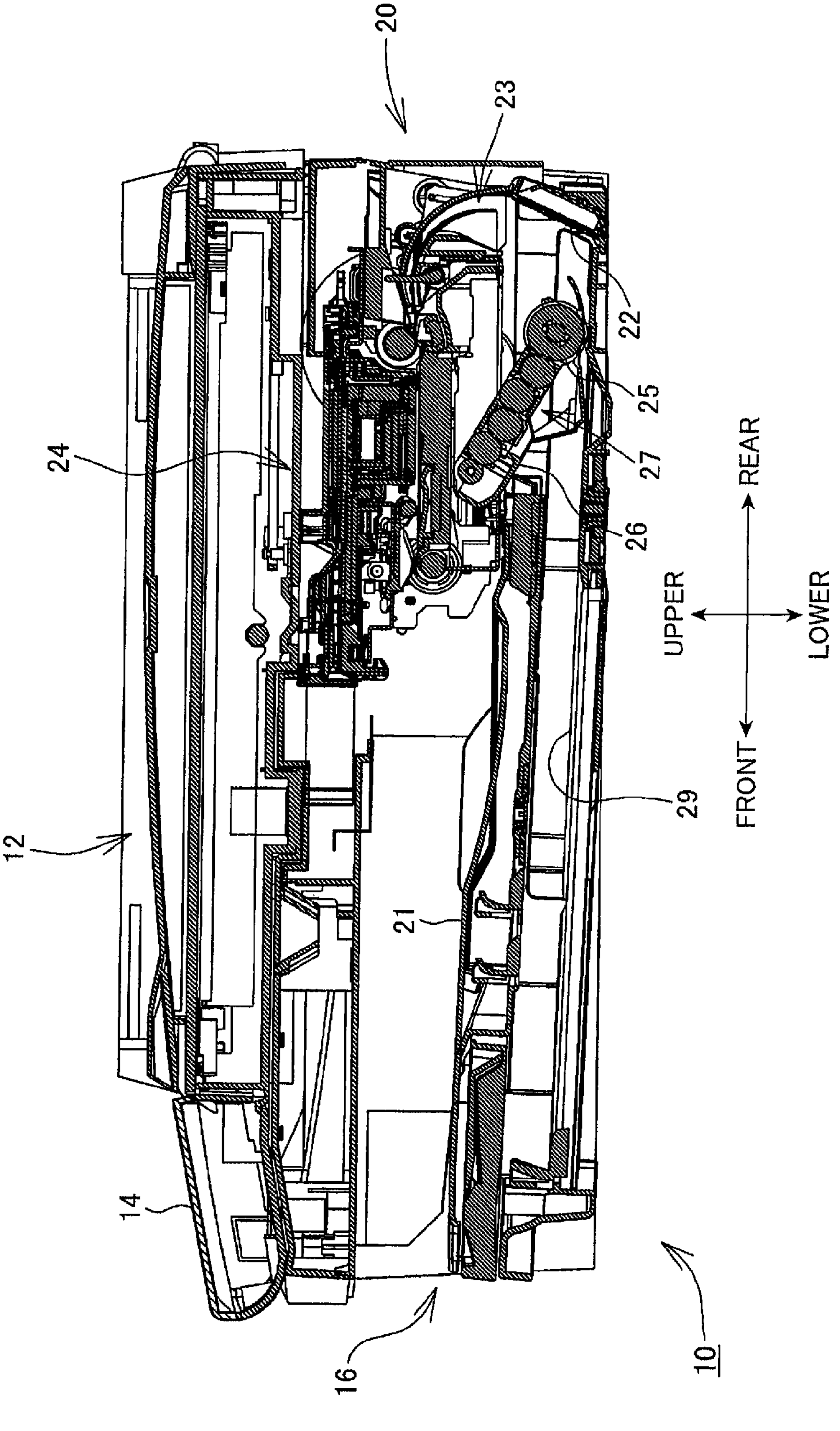
FIG. 2 is a vertical cross-sectional view of the multifunction device of FIG. 1 for showing the internal configuration of the multifunction device.

FIG. 2 is a perspective view of the multifunction device 10 for showing the internal configuration thereof. As shown in FIG. 2, the sheet-feeding tray 29 is arranged at the bottom side of the multifunction device 10. A separation slope plate 22 is arranged at the rear side (the right side of the sheet of FIG. 2) of the sheet-feeding tray 29. The separation slope plate 22 is inclined rearward toward the upper side. The separation slope plate 22 separates the recording sheet supplied from the sheet-feeding tray 29 and guides the recording sheet upward. A conveying path 23 is provided above the separation slope plate 22. Recording sheets are conveyed along the conveying path 23, part of which is formed in a curve. More specifically, the conveying path 23 is directed upward from the separation slope plate 22 and then curved and extended toward the front side of the multifunction device 10 (the left side in FIG. 2) so as to pass an image recording unit 24 (recording section) and to reach the sheet-discharging tray 21. Thus, recording sheets accommodated in the sheet-feeding tray 29 are guided, by one sheet at a time, in a U-turn from below to above along the conveying path 23 to get to the image recording unit 24 where an image is recorded, and then the recording sheet is discharged onto the sheet-discharging tray 21. The conveying path 23 is defined by an outer guide surface and an inner guide surface that are disposed in confrontation with each other with a predetermined gap therebetween, except the area where the image recording unit 24 is arranged.

Figure 3:
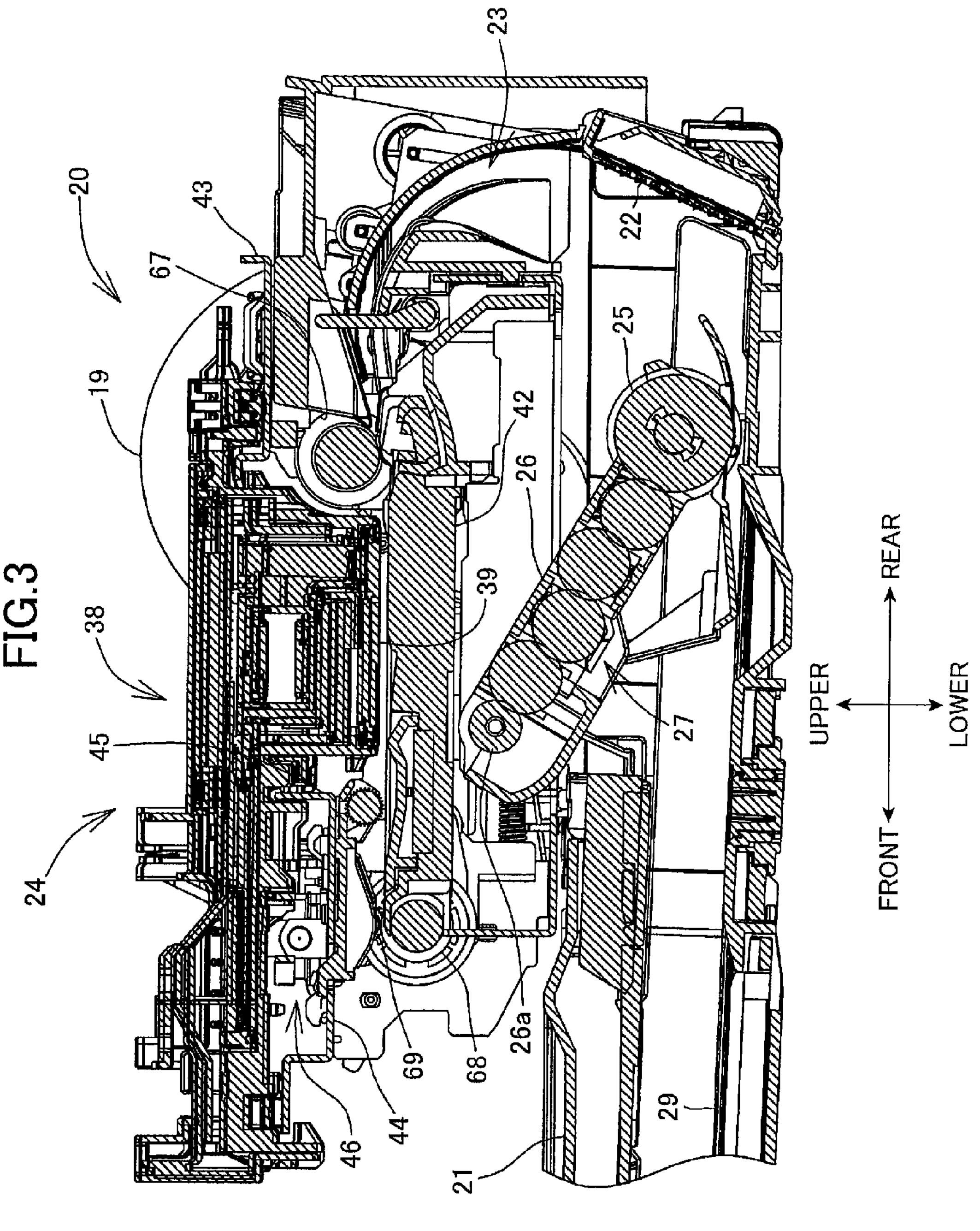
FIG. 3 is an enlarged partial cross-sectional view of a printer section in the multifunction device of FIG. 1, for showing the configuration of principal components of the printer section.

FIG. 3 is an enlarged partial cross-sectional view of the printer section 20 of FIG. 2 for showing the configuration of principal components thereof. As shown in FIG. 3, a sheet-feeding roller 25 is arranged above the sheet-feeding tray 29. The sheet-feeding roller 25 is in pressure contact with a recording sheet and supplies the recording sheet to a conveying roller 67 (see FIGS. 3 and 8) and a pinch roller 64 (see FIG. 8). As shown in FIGS. 3 and 8, the sheet-feeding roller 25 is arranged at the upstream side relative to the curved conveying path 23 in a conveying direction in which the recording sheet is conveyed (hereinafter referred to simply as "upstream side"). The sheet-feeding roller 25 is in pressure contact with the uppermost recording sheet of the recording sheets stacked on the sheet-feeding tray 29 and supplies the recording sheet to the separation slope plate 22. The sheet-feeding roller 25 is rotatably supported at the distal end of a sheet-feeding arm 26. The sheet-feeding roller 25 is driven to rotate as drive force is transmitted to the sheet-feeding roller 25 from an LF motor 85 (see FIG. 7) by way of a drive transmission mechanism 27 having a plurality of gears that are engaged with each other (see FIGS. 2 and 3).

As shown in FIG. 3, the sheet-feeding arm 26 is pivotally moved up and down so as to contact and separate from the sheet-feeding tray 29 about a spindle **26*a* as a pivotal axis. More specifically, the sheet-feeding arm 26 is configured to pivot downward by its own weight, such that the sheet feed roller 25 is brought into contact with the sheet-feeding tray 29. When the sheet-feeding tray 29 accommodates one or more recording sheets, the sheet feed roller 25 is brought into pressure contact with the uppermost recording sheet on the sheet-feeding tray 29. When the sheet-feeding tray 29 and the sheet-discharging tray 21 are drawn out to the outside through the opening 16 (see FIG. 2), the sheet-feeding arm 26 is pivotally moved upward (in the direction of arrow A1 in FIG. 8) to retreat. The sheet-feeding roller 25 is driven to rotate by the drive force transmitted from the LF motor 85 in a state where the sheet-feeding roller 25 is in pressure contact with the surface of the uppermost recording sheet on the sheet-feeding tray 29. Hence, the uppermost recording sheet is fed toward the separation slope plate 22 due to the friction force between the roller surface of the sheet-feeding roller 25 and the recording sheet. Subsequently, the leading edge of the recording sheet hits the separation slope plate 22 and guided upward onto the conveying path 23. When the uppermost recording sheet is fed out by the sheet-feeding roller 25, the recording sheet located immediately under the uppermost recording sheet may also be fed out due to the effect of friction and/or static electricity. In this case, the recording sheet located immediately under the uppermost recording sheet is blocked as the leading edge thereof hits the separation slope plate 22**.

As shown in FIG. 3, the conveying roller 67 is arranged at the downstream side relative to the curved conveying path 23 in the conveying direction of the recording sheet (hereinafter referred to simply as "downstream side"). As shown in FIG. 8, the pinch roller 64 is arranged at a position located in confrontation with the conveying roller 67 with the conveying path 23 interposed therebetween. Note that the pinch roller 64 is not shown in FIG. 3. The pinch roller 64 is urged by the conveying roller 67 so that the pinch roller 64 is in pressure contact with the conveying roller 67. As a recording sheet is supplied to the conveying path 23 by the sheet-feeding roller 25, the recording sheet moves into between the conveying roller 67 and the pinch roller 64. At this time, the pinch roller 64 is retracted by the distance equal to the thickness of the recording sheet to hold the recording sheet with the conveying roller 67. The conveying roller 67 is driven to rotate as drive force is transmitted from the LF motor 85 (see FIG. 7). The rotational force of the conveying roller 67 is reliably transmitted to the recording sheet so that the recording sheet is conveyed onto the platen 42 (see FIG. 3). As shown in FIGS. 3 and 8, an encoder disk 19 of the rotary encoder 83 (see FIG. 7) is provided to the conveying roller 67. The encoder disk 19 is arranged coaxially with the conveying roller 67 and is adapted to rotate with the conveying roller 67. Therefore, the rotation of the conveying roller 67 can be detected by detecting the rotation of the encoder disk 19. The encoder disk 19 will be described in greater detail hereinafter.

The recording sheet is conveyed as the conveying roller 67 and the pinch roller 64 repeat an operation of holding a recording sheet and conveying the recording sheet by a unit feed amount. After the leading edge of the recording sheet P (see FIG. 8) reaches a position between the conveying roller 67 and the pinch roller 64, a control unit 100 (see FIG. 7), which will be described in greater detail hereinafter, controls the conveying roller 67 to rotate intermittently by a rotational amount that corresponds to the unit feed amount. The "unit feed amount" is equal to a linefeed amount that is observable when the recording head 39 (see FIGS. 7 and 8) continuously records an image on the recording sheet P. In other words, the recording sheet P is held between the conveying roller 67 and the pinch roller 64 and conveyed below the recording head 39 by the linefeed amount. As the recording sheet P is conveyed by the linefeed amount, the control unit 100 controls the recording head 39 to move in the main scanning direction (the direction perpendicular to the sheet of FIG. 8) and eject ink in order to record an image on the recording sheet P. Thus, an operation of recording an image on the recording sheet P for each linefeed amount and an operation of conveying the recording sheet P by the unit feed amount are repeated alternately, thereby recording a continuous image on the entire area of the recording sheet P.

As shown in FIG. 3, the image recording unit 24 is arranged at the downstream side of the conveying roller 67. The image recording unit 24 includes a head controller (head control board) 33 (see FIG. 7) and the recording head 39 (see FIG. 7) mounted on the carriage 38 (see FIG. 4) that reciprocates in the main scanning direction (the direction perpendicular to the sheet of FIG. 3). Note that the main scanning direction is a direction substantially orthogonal to the conveying direction of the recording sheet. That is, the main scanning direction is the same direction as a widthwise direction (orthogonal direction). Ink of the four colors is supplied from the ink cartridge to the recording head 39 by way of the ink tube 41 (see FIG. 4). The four colors of ink are cyan (C), magenta (M), yellow (Y) and black (Bk) as described earlier. The recording head 39 selectively ejects ink onto the recording sheet as small ink droplets. The recording sheet is conveyed on the platen 42 by the conveying roller 67 and the pinch roller 64. In the course of conveying, the recording head 39 selectively ejects ink droplets as the head 39 is driven to move in a direction substantially orthogonal to the conveying direction of the recording sheet due to the reciprocating motion of the carriage 38. In this way, an image is recorded on the recording sheet as the recording sheet passes on the platen 42.

A sheet-discharging roller 68 (see FIGS. 3 and 8) is arranged at the downstream side of the image recording unit 24. A spur roller 69 is arranged at a position located in confrontation with the sheet-discharging roller 68 with the conveying path 23 interposed therebetween. The spur roller 69 is held in pressure contact with the sheet-discharging roller 68. As the recording sheet passes through the platen 42, an image is recorded on the recording sheet by the image recording unit 24. As the recording sheet moves in between the conveying roller 68 and the spur roller 69, the recording sheet is held between the sheet-discharging roller 68 and the spur roller 69. The drive force of the LF motor 85 (see FIG. 7) is transmitted to the conveying roller 67 and also to the sheet-discharging roller 68. Hence, the conveying roller 67 and the sheet-discharging roller 68 are driven to move intermittently by a predetermined linefeed amount. The rotation of the conveying roller 67 is synchronized with the rotation of the sheet-discharging roller 68.

Figure 4:
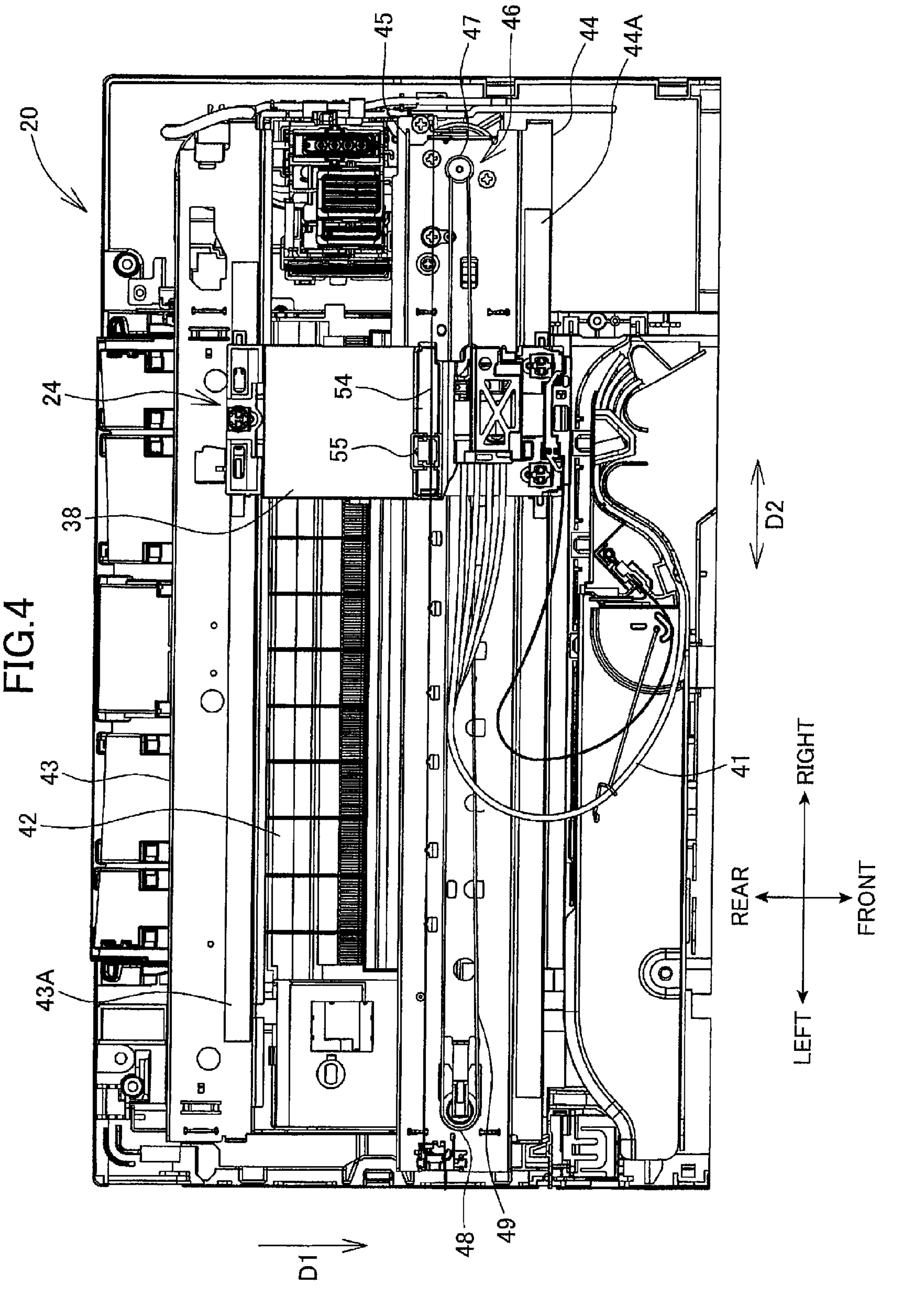
FIG. 4 is a plan view of the printer section of FIG. 3.

FIG. 4 is a plan view of the printer section 20 for showing the configuration of principal components thereof. As shown in FIG. 4, a pair of guide rails 43 and 44 is arranged on the upper side of the conveying path 23 (the upside of FIG. 3). The guide rails 43 and 44 are separated from each other by a predetermined distance in a conveying direction D1 of the recording sheet so as to extend in a direction D2 orthogonal to the conveying direction D1 (hereinafter referred to as "widthwise direction"). The carriage 38 is arranged so as to straddle both the guide rails 43 and 44 and can reciprocate in a horizontal direction (widthwise direction D2) orthogonal to the conveying direction D1.

The guide rail 43 is arranged at the upstream side relative to the guide rail 44. The guide rail 43 is plate-shaped and its length in the widthwise direction D2 (orthogonal direction) of the conveying path 23 (see FIG. 3) is greater than a reciprocating range of the carriage 38. The upper surface of the guide rail 43 located at the downstream side serves as guide surface 43A. The upstream end of the carriage 38 is supported by the guide surface 43A so as to be able to slide on the guide surface 43A.

The guide rail 44 is arranged at the downstream side relative to the guide rail 43. The guide rail 44 is plate-shaped and its length in the widthwise direction of the conveying path 23 is substantially same as the guide rail 43. An upstream edge 45 of the guide rail 44 is substantially perpendicularly bent toward the upward. The upper surface of the guide rail 44 located at the upstream side serves as guide surface 44A. The downstream edge of the carriage 38 is supported by the guide surface 44A so as to be able to slide on the guide surface 44A. The carriage 38 pinches and holds the upstream edge 45 by rollers (not shown). With this configuration, the carriage 38 is held on the guide surfaces 43A and 44A of the guide rails 43 and 44 so as to be able to slide on the guide surfaces 43A and 44A. Then, the carriage 38 can reciprocate in the horizontal direction that is orthogonal to the conveying direction of the recording sheet. The upstream edge 45 of the guide rail 44 serves as a reference for the reciprocating motion.

A belt drive mechanism 46 is arranged on the upper surface of the guide rail 44. The belt drive mechanism 46 is arranged along the guide rail 44. The belt drive mechanism 46 includes a drive pulley 47, a follow pulley 48 and a timing belt 49. The drive pulley 47 and the follow pulley 48 are arranged respectively near the widthwise ends of the conveying path 23. The timing belt 49 is an endless belt provided on the inside thereof with teeth and wound around the drive pulley 47 and the follow pulley 48. The drive pulley 47 is provided on the outer periphery thereof with teeth to be engaged with the teeth of the timing belt 49. Thus, the rotation of the drive pulley 47 is reliably transmitted to the timing belt 49 and the timing belt 49 is driven to move circularly. The carriage 38 is linked to the timing belt 49. Therefore, the carriage 38 reciprocates on the guide rails 43 and 44 according to the operation of the belt drive mechanism 46. The recording head 39 is mounted on the carriage 38. Thus, the recording head 39 can reciprocate in the main scanning direction that is the widthwise direction (orthogonal direction D2) of the conveying path 23.

The drive pulley 47 is arranged at one of the opposite ends (right end in FIG. 4) of the upper surface of the guide rail 44 so as to be able to rotate about a shaft extending in a direction orthogonal to the guide surface 44A. In other words, the axial direction of the drive pulley 47 is the vertical direction. Although not shown in FIG. 4, a CR (carriage) motor 80 (see FIG. 7) is arranged at the lower side of the guide rail 44. The drive force of the CR motor 80 is transmitted to the shaft of the drive pulley 47. Hence, the driven pulley 47 is driven to rotate and the carriage 38 reciprocates.

An encoder strip 54 (see FIG. 4) of a linear encoder 84 (see FIG. 7) is arranged along the edge 45 of the guide rail 44. The linear encoder 84 is configured to detect the encoder strip 54 by means of a photo interrupter 55 (see FIG. 4) mounted on the carriage 38. The reciprocation of the carriage 38 is controlled according to the detection signal of the linear encoder 84.

As shown in FIG. 4, the platen 42 is arranged at the lower side of the conveying path 23 and in confrontation with the recording head 39. The platen 42 is arranged over a central part of the reciprocating range of the carriage 38 where the recording sheet passes. The platen 42 has a width sufficiently larger than the largest width of recording sheets that can be conveyed in the multifunction device 10. Therefore, the recording sheet is conveyed along the conveying path 23 in such a way that both widthwise edges of the recording sheet always pass on the platen 42. The platen 42 and the guide rails 43 and 44 are arranged in parallel with each other with a predetermined gap therebetween. Thus, the lower surface of the recording head 39 that is driven to slide on the guide rails 43 and 44 and the upper surface of the platen 42 confront each other with a predetermined head gap interposed therebetween.

Ink is supplied to the recording head 39 through the ink tube 41 (see FIG. 4) that is linked to the ink cartridges (not shown). Ink cartridges are provided for respective ink colors. More specifically, ink of the different colors is supplied to the recording head 39 through respective ink tubes 41 that are independent from each other. The ink tubes 41 are made of synthetic resin and flexible. Therefore, the ink tubes 41 can follow the recording head 39, changing their shapes according to the reciprocation of the carriage 38.

Figure 5:
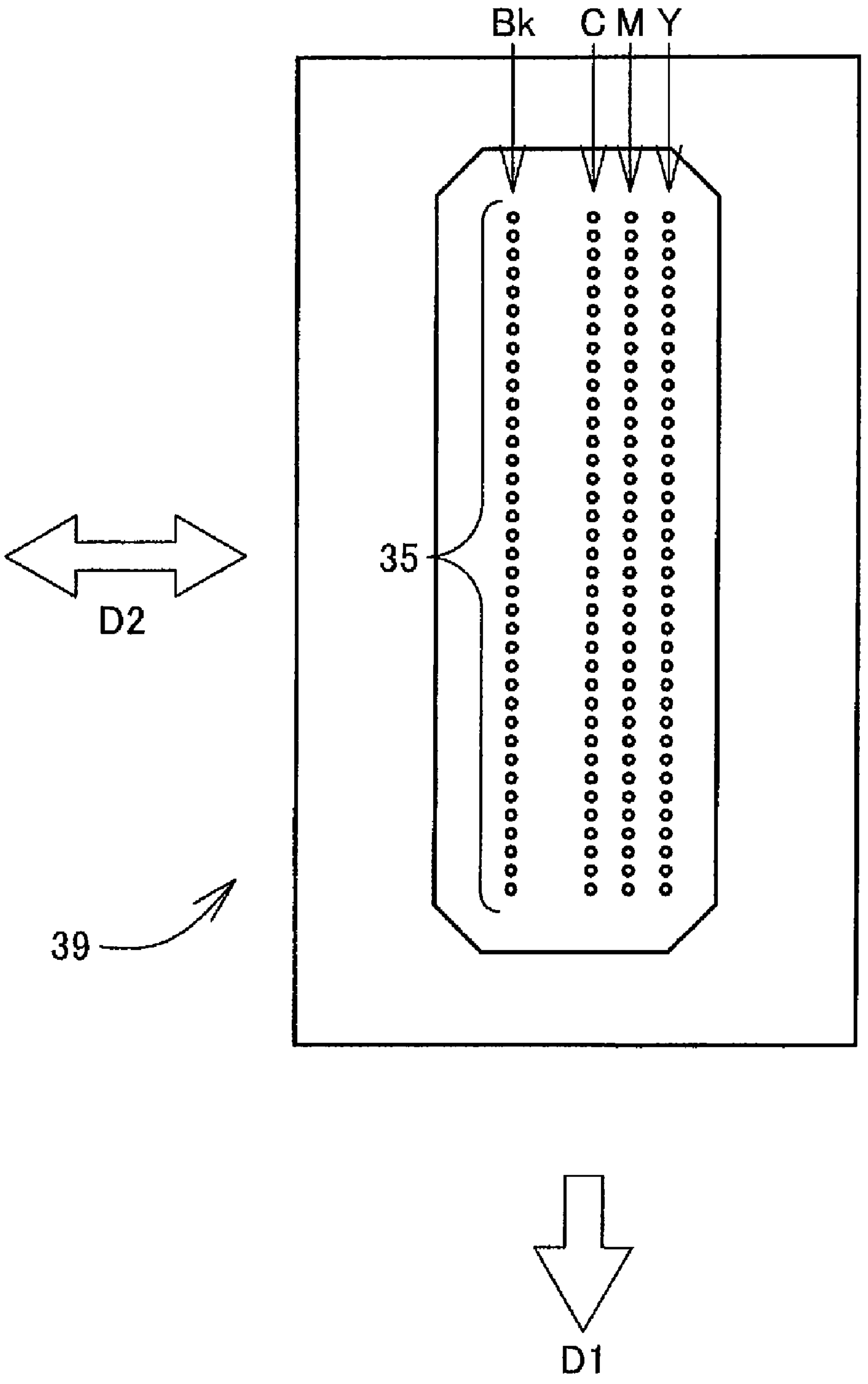
FIG. 5 is a bottom view of a nozzle surface of a recording head in the printer section of FIG. 3.

FIG. 5 is a bottom view of a nozzle surface of the recording head 39. As shown in FIG. 5, the recording head 39 has nozzles 35 on the bottom surface that are arranged in the conveying direction D1 for each of different colors of cyan (C), magenta (M), yellow (Y), and black (Bk). Note that, in FIG. 5, the recording sheet is conveyed in the conveying direction D1 and the carriage 38 reciprocates in the widthwise direction D2. The nozzles 35 of each ink color are arranged in a row extending in the conveying direction D1 and the rows of the nozzles 35 of the different ink colors are arranged side by side in the reciprocating direction of the carriage 38 (in the widthwise direction D2) The pitch of arrangement and the number of the nozzles 35 of each ink color may be set appropriately by taking the resolution of images to be recorded and other factors into consideration. The number of rows of nozzles 35 will be increased or decreased depending on the number of different ink colors.

Figure 6:
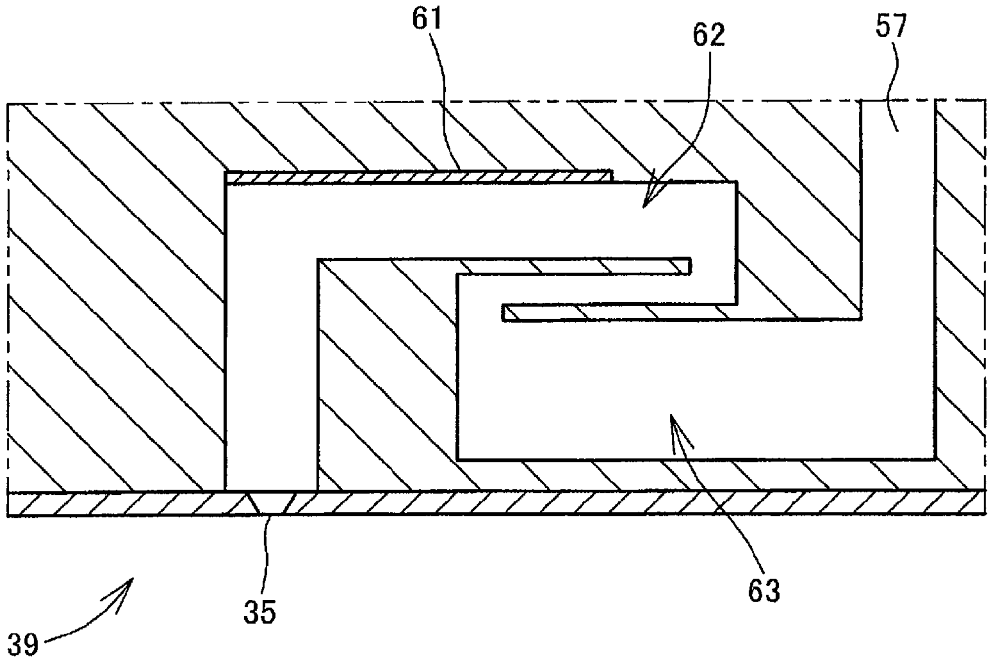
FIG. 6 is an enlarged partial cross-sectional view of the recording head of FIG. 5 for showing the internal configuration of the recording head.

FIG. 6 is an enlarged partial cross-sectional view of the recording head 39, showing the internal configuration thereof. As shown in FIG. 6, a cavity 62 is formed at the upstream side of each of the nozzles 35 formed at the lower surface of the recording head 39 and provided with a piezoelectric element 61. The piezoelectric element 61 is deformed as a predetermined voltage is applied to the element 61 by the head controller 33 (see FIG. 7). Hence, the volume of the cavity 62 is reduced. As the volume of the cavity 62 changes, ink in the cavity 62 is ejected as ink droplets from the nozzles 35.

As pointed out above, the cavity 62 is provided for each of the nozzles 35 and a manifold 63 is formed over a plurality of cavities 62. More specifically, manifolds 63 are formed for the respective ink colors of cyan (C), magenta (M), yellow (Y), and black (Bk). An ink supply port 57 is formed at the upstream side of each of the manifolds 63. The ink supply port 57 is in fluid communication with the above described subsidiary tank so that ink is supplied from the ink supply port 57 to the inside of the recording head 39. The ink supplied from the ink supply port 57 to the manifold 63 is distributed to the cavities 62 through the manifold 63. The ink that flows into the cavities 62 through the manifold 63 is then ejected onto the recording sheet as ink droplets from the nozzles 35 when the piezoelectric element 61 is deformed.

Figure 7:
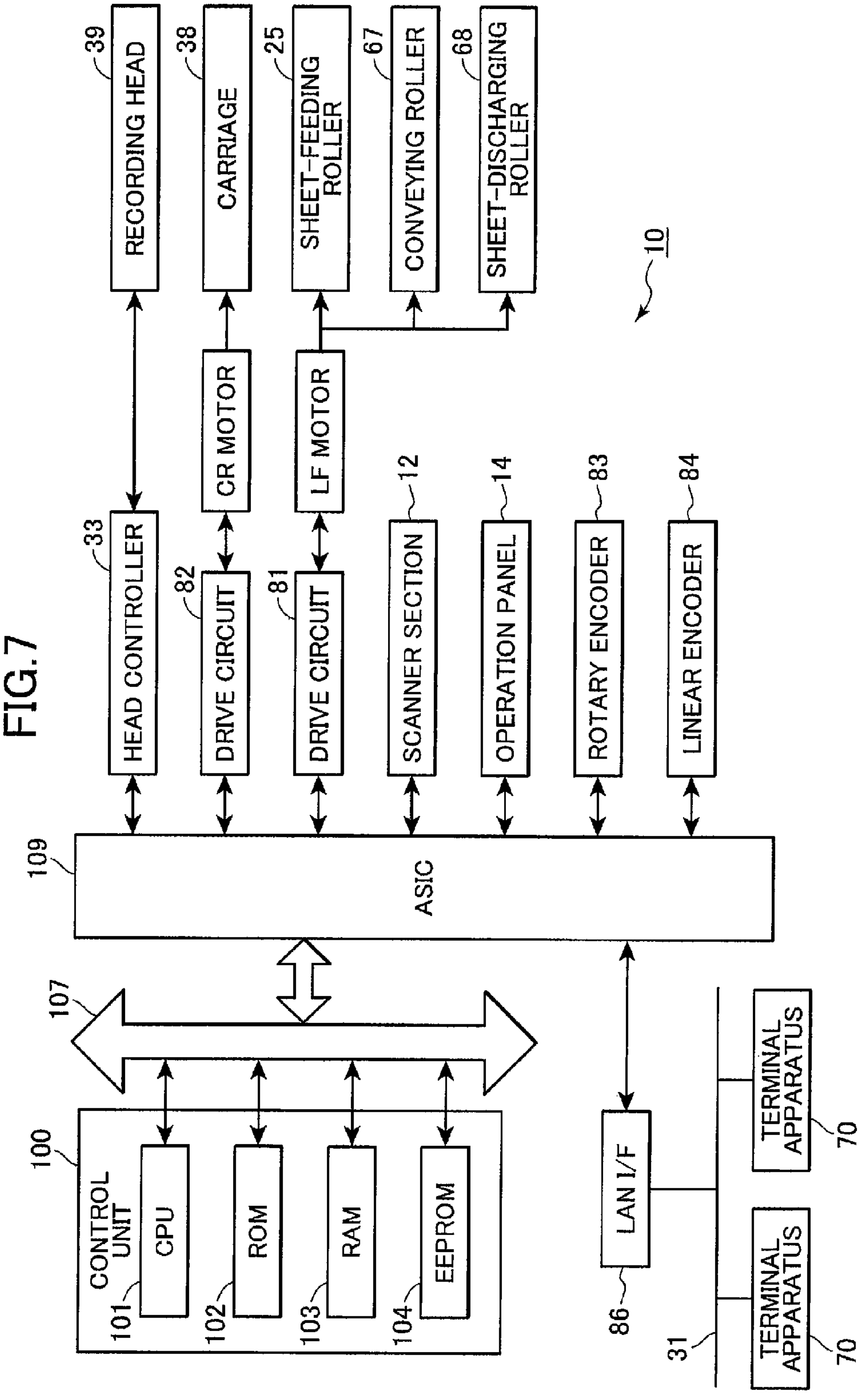
FIG. 7 is a block diagram of the multifunction device according to the first embodiment.
Figure 8:
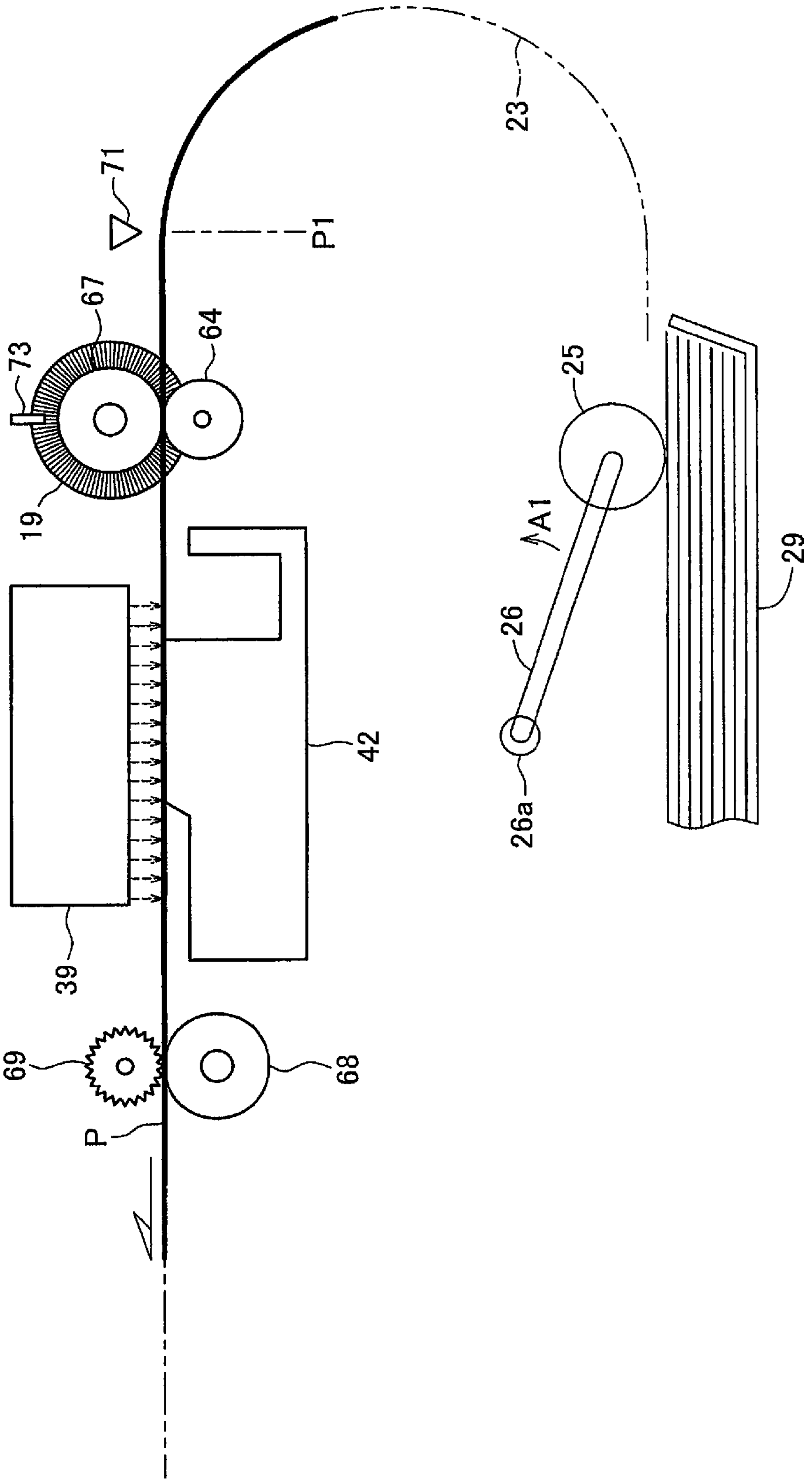
FIG. 8 is an explanatory diagram showing a U-turn path of a conveying path in the multifunction device according to the first embodiment.

FIG. 7 is a block diagram of the multifunction device 10 according to the embodiment. The control unit 100 controls the overall operation of the multifunction device 10. As shown in FIG. 7, the control unit 100 is configured by a microcomputer having a CPU (central processing unit) 101, a ROM (read only memory) 102, a RAM (random access memory) 103, an EEPROM (electrically erasable and programmable ROM) 104 as principal components thereof. The control unit 100 is connected to an ASIC (application specific integrated circuit) 109 by way of a bus 107.

The ROM 102 stores programs by which the CPU 101 controls various operations of the multifunction device 10. The RAM 103 serves as storage area or work area for temporarily storing various data that the CPU 101 employs when the CPU 101 executes the above programs. In this embodiment, the RAM 103 temporarily stores the distance by which the recording sheet P is conveyed as detected by the rotary encoder 83. The EEPROM 104 stores settings and flags that need to be kept after turning off the power supply.

The ASIC 109 is connected to the head controller 33, the drive circuit 82, the drive circuit 81, the scanner section 12 (see FIG. 1), the operation panel 14 (see FIG. 1), the rotary encoder 83, the linear encoder 84, and the LAN I/F (local area network interface) 86.

The head controller 33 drives and controls the recording head 39 according to video signals inputted from the ASIC 109. Hence, ink of different colors are selectively ejected from the nozzles 35 (see FIG. 5) of the recording head 39 at predetermined timings to record an image on the recording sheet. The head controller 33 is mounted on the carriage 38 (see FIG. 4) together with the recording head 39.

The drive circuit 82 supplies a drive signal to the CR motor 80 according to a phase excitation signal input from the ASIC 109. The reciprocation of the carriage 38 is controlled as the CR motor 80 is driven to rotate according to the received drive signal.

The drive circuit 81 drives the LF motor 85. The LF motor 85 is connected to the sheet-feeding roller 25 (see FIG. 3), the conveying roller 67 (see FIG. 3), and the sheet-discharging roller 68 (see FIG. 3). The drive circuit 81 drives the LF motor 85 in response to an output signal received from the ASIC 109. The drive force of the LF motor 85 is selectively transmitted to the sheet-feeding roller 25, the conveying roller 67, and the sheet-discharging roller 68 via a well-known drive mechanism that typically includes gears and drive shafts.

The scanner section 12 reads out an image of an original (document). The operation panel 14 has input keys by which the user inputs information and a liquid crystal display that displays various information.

The rotary encoder 83 observes the rotation of the conveying roller 67 and detects an amount (distance) by which the recording sheet P (see FIG. 8) is conveyed. The control unit 100 controls the LF motor 85 (see FIG. 7) that drives the conveying roller 67 to rotate in order to convey the recording sheet P according to the results of detection of the rotary encoder 83. The linear encoder 84 detects an amount of movement of the carriage 38 that reciprocates in the widthwise direction D2 (see FIG. 4). The control unit 100 controls the reciprocation of the carriage 38 according to the results of detection of the linear encoder 84.

The LAN I/F 86 is an interface that communicably connects the LAN 31 and the multifunction device 10 to each other. The LAN 31 is connected to the terminal apparatus 70. The multifunction device 10 is connected to the terminal apparatus 70 via the LAN 31. Although not described in detail, the ASIC 109 is connected to a slot section for receiving various small memory cards and to other components.

FIG. 8 is an explanatory diagram showing the conveying path 23. As shown in FIG. 8, a registration sensor 71 is arranged at the upstream side of the conveying roller 67 and the pinch roller 64 on the conveying path 23. The registration sensor 71 detects the presence or absence of a recording sheet P being conveyed along the conveying path 23. The registration sensor 71 of this embodiment is a mechanical sensor. The registration sensor 71 is provided with a reflection type photosensor (photo interrupter) and a feeler that is pivotally supported by a shaft. The photo interrupter has a light emitting section that emits light toward the feeler and a light receiving section that receives light reflected by the feeler. The registration sensor 71 outputs a sensor signal (e.g., an electric signal representing a luminance) according to the luminance of light received by the light receiving section of the photo interrupter. When the feeler is located in confrontation with the photo interrupter, light reflected by the feeler is received by the light receiving section. Then, the registration sensor 71 outputs a sensor signal that represents intensity of light received by the light receiving section. In other words, the registration sensor 71 is ON because the feeler is detected. As the recording sheet P gets to the position P1 (see FIG. 8), the recording sheet P hits the feeler to turn the feeler. Hence, the feeler changes its position from the position confronting the photo interrupter. Now, light emitted from the light emitting section is no longer reflected by the feeler toward the light receiving section. In other words, the light emitted from the light emitting section is not received by the light receiving section. Thus, the light receiving section does not output any electric current. Thus, the registration sensor 71 becomes OFF. The state of the registration sensor 71 changes as a recording sheet P arrives at the position P1 so that the control unit 100 can detect the recording sheet P according to the sensor signal output from the registration sensor 71.

As shown in FIG. 8, the conveying roller 67 is provided with the encoder disk 19 and the photosensor 73. The encoder disk 19 is a transparent disk that rotates with the conveying roller 67 and is provided with radial marks that are arranged at a predetermined pitch. In other words, the encoder disk 19 is fixedly secured to the shaft of the conveying roller 67 and rotates with the conveying roller 67. The photosensor 73 is arranged at a position close to the conveying roller 67. More specifically, the photosensor 73 is arranged at such a position that the peripheral edge of the encoder disk 19 is located in the space between a light emitting element and a light receiving element. The rotary encoder 83 detects the rotation of the encoder disk 19 by counting the number of marks of the encoder disk 19 based on detection results of the photosensor 73. Since the conveying roller 67 rotates with the encoder disk 19, the rotation of the conveying roller 67 can be detected by detecting the rotation of the encoder disk 19. Each time a mark of the encoder disk 19 is detected, a single pulse signal is output from the photosensor 73. The rotary encoder 83 detects the rotation of the conveying roller 67 by counting the number of the pulse signals. As the rotation of the conveying roller 67 is detected, the amount by which the recording sheet P is conveyed is detected.

Figure 9:
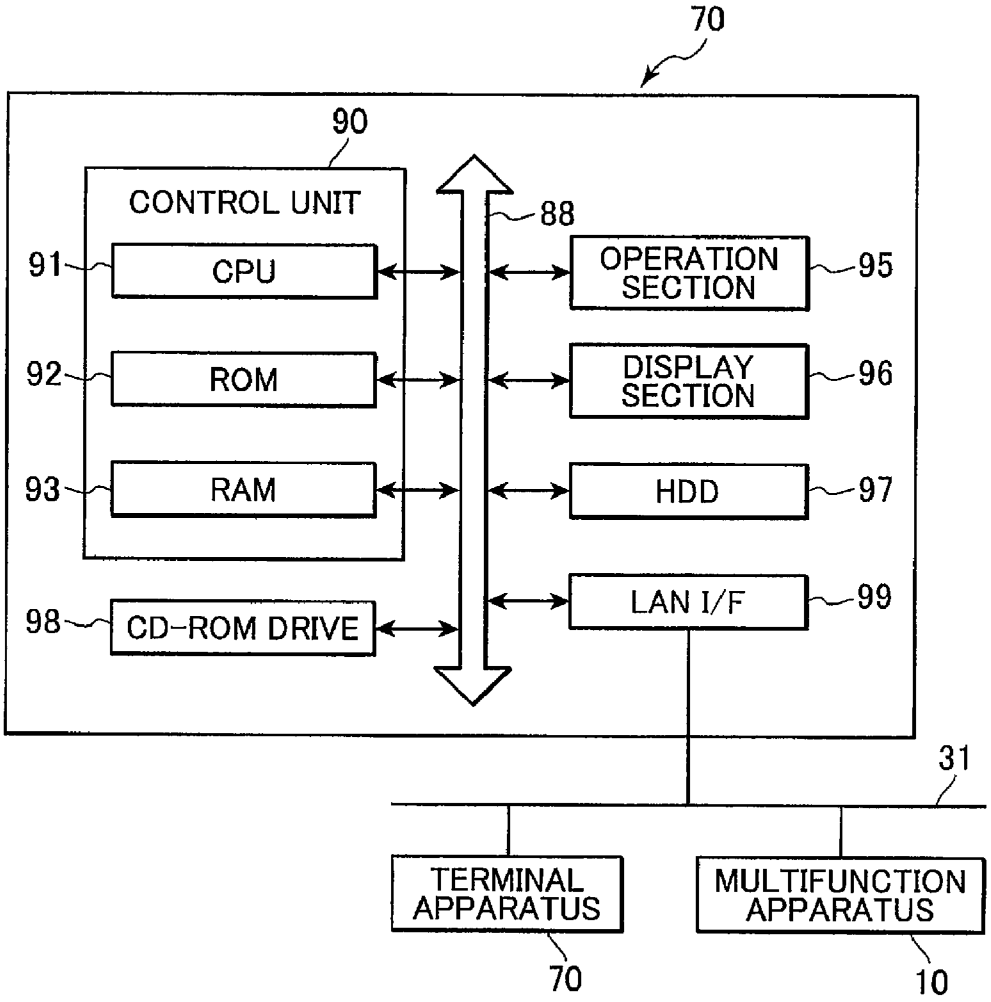
FIG. 9 is a block diagram of a terminal apparatus according to the first embodiment.

FIG. 9 is a block diagram of the terminal apparatus 70 according to the embodiment. The terminal apparatus 70 may typically be a personal computer. A control unit 90 controls the overall operation of the terminal apparatus 70. As shown in FIG. 9, the control unit 90 is mainly configured by a microcomputer having a CPU 91, a ROM 92, and a RAM 93. The control unit 90 is connected to an operation section 95, a display section 96, an HDD (hard disk drive) 97, a CD-ROM drive 98, and a LAN I/F 99 via a bus 88.

The ROM 92 stores programs by which the CPU 91 controls various operations of the terminal apparatus 70. The RAM 93 serves as storage area or work area for temporarily storing various data that the CPU 91 employs when the CPU 91 executes the above programs.

The operation section 95 is adapted to receive operation inputs such as instructions for operations and settings of the terminal apparatus 70 and typically includes a keyboard and a mouse. The terminal apparatus 70 transfers print data to the multifunction device 10 and controls the multifunction device 10 to execute a printing process. The operation section 95 receives operation inputs for setting print conditions. The display section 96 displays various information and typically includes a liquid crystal display. The display section 96 displays the operating conditions of the terminal apparatus 70 and various settings on print conditions for printing an image according to print data that is transferred to the multifunction device 10.

The HDD 97 is a storage device containing a storage medium having a large capacity memory region. The HDD 97 stores various data generated by the terminal apparatus 70, image data to be used for the printing process that the multifunction device 10 executes and so on. Additionally, the HDD 97 stores a first pixel number N1, a second pixel number N2, and a replacement-region setting line number N3 in association with each of various sets of print conditions. The first pixel number N1, the second pixel number N2, and the replacement-region setting line number N3 will be described in greater detail hereinafter. The HDD 97 stores programs including drivers for controlling various pieces of hardware and various pieces of application software. The printer driver is saved in the HDD 97 by using the CD-ROM drive 98. The control unit 90 reads out and executes the printer driver. The printer driver may alternatively be installed in the terminal apparatus 70 via the Internet.

The LAN I/F 99 is an interface that communicably connects the LAN 31 to the terminal apparatus 70. The LAN 31 is connected to the multifunction device 10. The terminal apparatus 70 is connected to the multifunction device 10 via the LAN 31.

Figure 10:
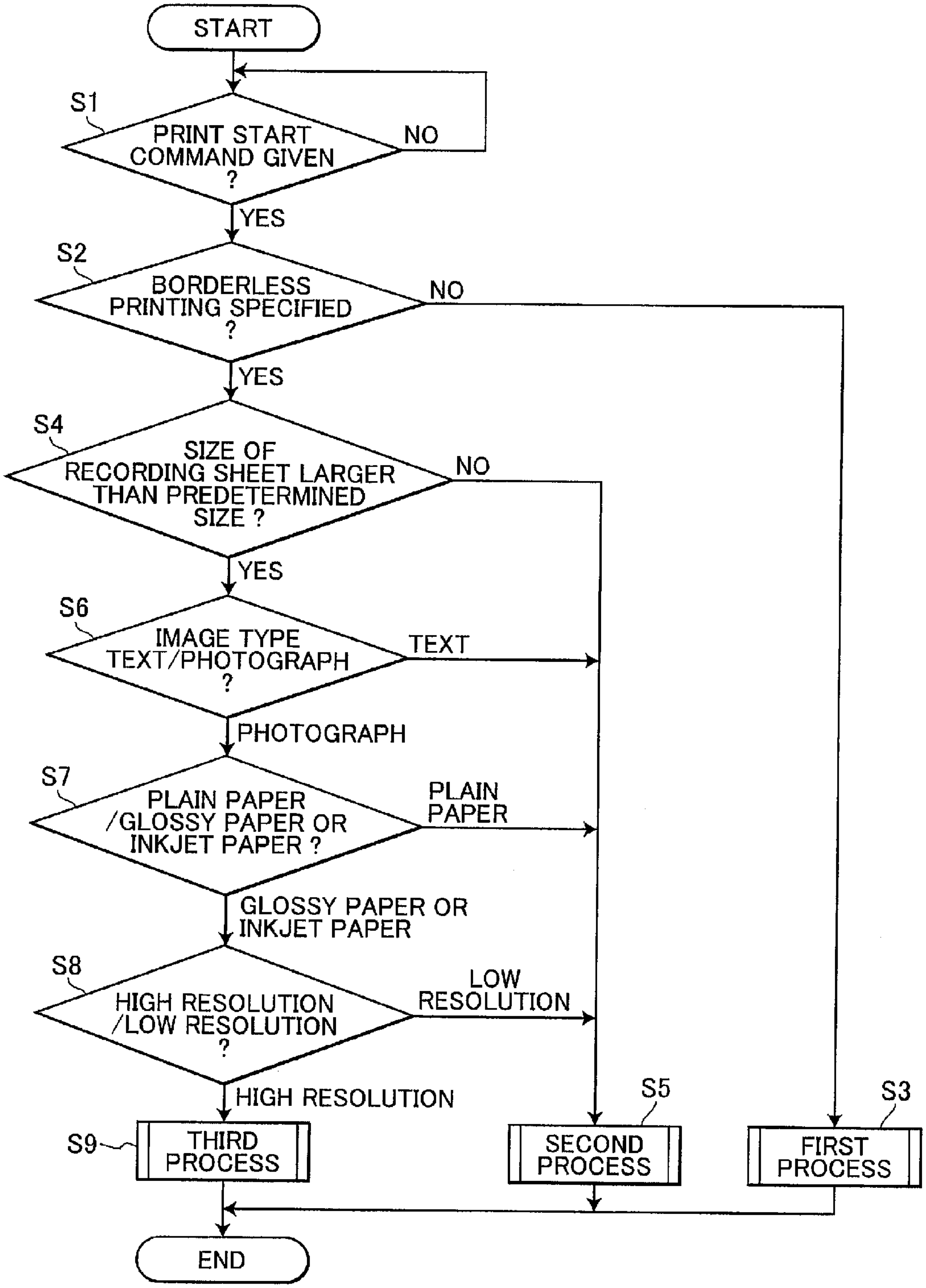
FIG. 10 is a flowchart showing a process that is executed by the terminal apparatus when a print start command is inputted.

FIG. 10 is a flowchart showing a process that is executed by the terminal apparatus 70 when a print start command is inputted. The process in FIG. 10 described below is executed according to instruction that the control unit 90 issues based on a program stored in the ROM 92 and a printer driver stored in the HDD 97.

When a predetermined operation input is given from the operation section 95 to the multifunction device 10 for executing a printing process, a setting screen (not shown) for setting print conditions of the multifunction device 10 is displayed on the display section 96. The user can specify the print conditions by operating the operation section 95 to check related check boxes displayed on the setting screen. In this embodiment, the print conditions include the size of the recording sheet to be used for printing, the image type indicated by the print data, the type of the recording sheet, and the resolution of the image to be recorded on the recording sheet. The sizes of recording sheet include A4 size, B5 size, A5 size, postcard size, L size, B4 size, and legal size. The image types include text and photograph. The types of recording sheet include plain paper (ordinary paper), glossy paper, inkjet paper, and the like. The resolutions include high resolution (e.g., 1,200×1,200 dpi) and low resolution (e.g., 600×600 dpi). Determination in determination steps in FIG. 10 are made based on information inputted from the operation section 95 in accordance with the setting screen or default print conditions. Steps are hereinafter referred to as "S".

The control unit 90 determines whether a print start command is given (S1) based on presence or absence of a predetermined operation input for directing a printing start from the operation section 95. The control unit 90 moves to a standby state when the control unit 90 determines that no print start command is given (S1: NO). When the control unit 90 determines that a print start command is given (S1: YES), the control unit 90 then determines whether borderless recording is specified based on presence or absence of a predetermined operation from the operation section 95 (S2). When the control unit 90 determines that borderless recording is not specified (S2: NO), the control unit 90 then executes a first process shown in FIG. 11 (S3).

When the control unit 90 determines that borderless recording is specified (S2: YES), the control unit 90 determines whether the size of the recording sheet is larger than a predetermined size (e.g., B5 size) (S4). When the control unit 90 determines that the size of the recording sheet is not larger than the predetermined size (e.g., postcard size) (S4: NO), the control unit 90 then executes a second process shown in FIG. 13 (S5). The second process is executed when the recording sheet is expected to be conveyed slightly obliquely during borderless printing at the multifunction device 10.

When the control unit 90 determines that the size of the recording sheet is larger than the predetermined size (S4: YES), the control unit 90 then determines whether the image type of the print data to be transmitted to the multifunction device 10 is text or photograph (S6). When the control unit 90 determines that the image type is text (S6: text), the process proceeds to S5. When the control unit 90 determines that the image type is photograph (S6: photograph), the control unit 90 then determines whether the specified type of the recording sheet is plain paper, or glossy paper or inkjet paper (S7). When the control unit 90 determines that the specified type of the recording sheet is plain paper (S7: plain paper), the process proceeds to S5.

When the control unit 90 determines that the specified type of the recording sheet is glossy paper or inkjet paper (S7: glossy paper or inkjet paper), the control unit 90 then determines whether the specified resolution is high resolution or low resolution (S8). When the control unit 90 determines that the low resolution is specified (S8: low resolution), the process proceeds to S5. When the control unit 90 determines that the high resolution is specified (s8: high resolution), the control unit 90 then executes a third process shown in FIG. 15 (S9). The third process is executed when the recording sheet is expected to be conveyed considerably obliquely during borderless printing at the multifunction device 10. Note that the image type (determined in S6) and the resolution of the image (determined in S8) are conditions for the image, not for the recording sheet. However, if the image type is photograph and if the resolution of the image is high resolution, it is highly probable that the user uses a recording sheet that is likely to be conveyed obliquely.

Figure 11:
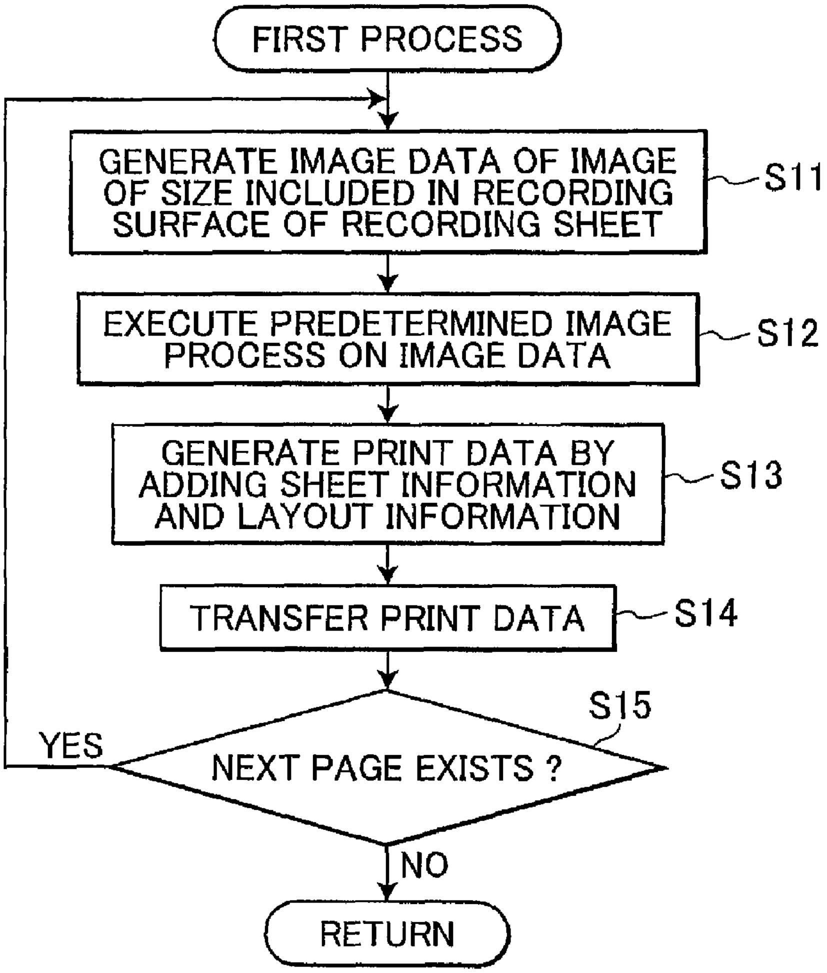
FIG. 11 is a detailed flowchart of a first process in FIG. 10.
Figure 12:
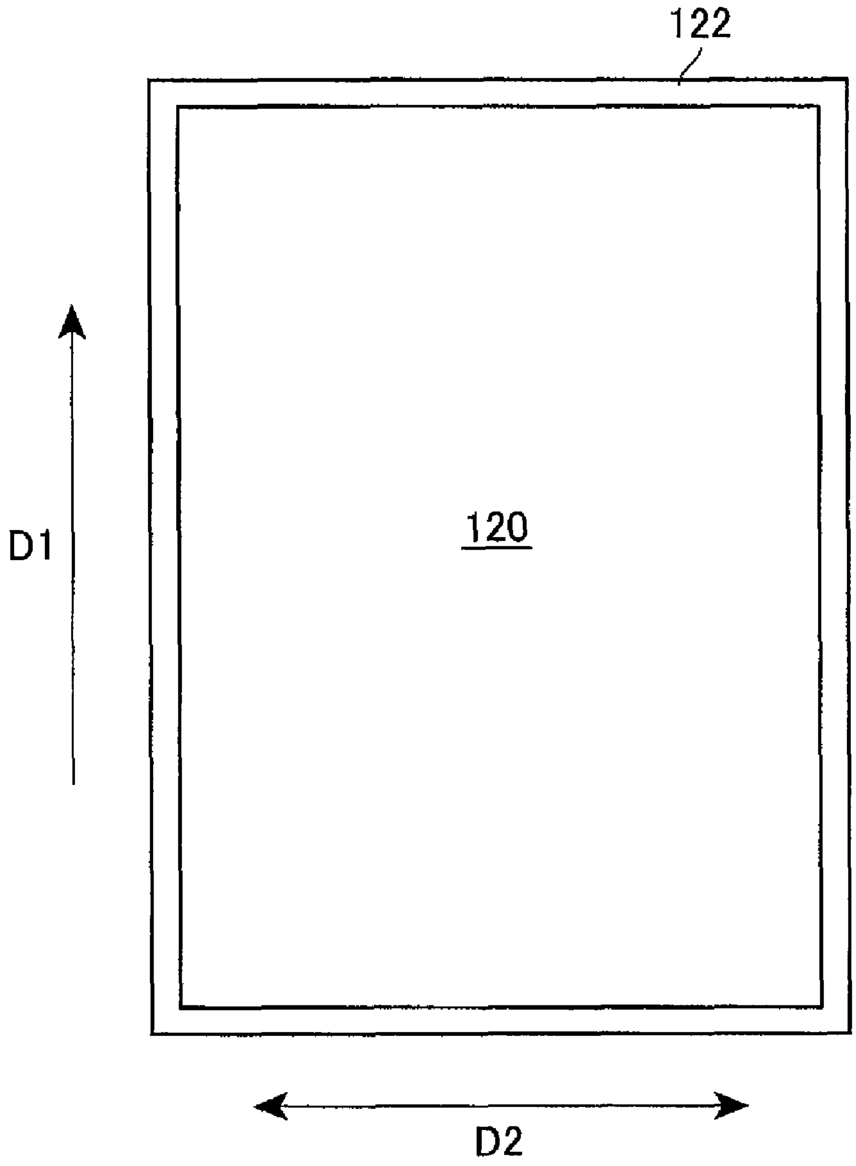
FIG. 12 is an explanatory diagram showing dimensional relationship between an image of print data and a recording surface of a recording sheet.

FIG. 11 is a detailed flowchart of the first process of S3 in FIG. 10. FIG. 12 is an explanatory diagram showing the dimensional relationship between an image 120 of print data and a recording surface 122 of a recording sheet.

When the control unit 90 determines in S2 that "borderless recording" is not specified (S2: NO), the control unit 90 generates image data of an image of a size that can be included in the recording surface 122 of the recording sheet (S1). More specifically, the control unit 90 generates image data of an image of a size smaller than the recording surface 122 of the recording sheet according to drawing instruction (for text drawing or graphic drawing) from an application program. The generated image data are image data for one page of an image having three primary color components of red (R), green (G), and blue (B). The image data are multi-valued color image data and expressed by 8-bit data (256 gradations) per each of the primary color components.

The control unit 90 executes a predetermined image process on the generated image data (S12). More specifically, the control unit 90 converts the image data of the RGB color system into image data of the CMYK color system. In other words, the control unit 90 generates image data of four fundamental color components of cyan (C), magenta (M), yellow (Y), and black (K) according to the image data of the RGB color system. Then, the control unit 90 binarizes the image data of the CMYK color system by means of an error diffusion process or a dither process.

The control unit 90 generates print data by adding sheet information and layout information to the image data (S13). The control unit 90 then transfers the generated print data to the multifunction device 10 (S14). As a result, the multifunction device 10 records an image on the recording sheet according to the print data transferred to the multifunction device 10 in S14. As shown in FIG. 12, the size of the image 120 of the print data is such that the image is included in the recording surface 122 of the recording sheet. Therefore, a margin is produced along the periphery of the recording sheet where the image has been recorded according to the print data. This image recording of the multifunction device 10 is a well-known ordinary printing process, which will not be described here in greater detail.

Then, the control unit 90 determines whether the next page exists (S15). When the control unit 90 determines that the next page exists (S15: YES), the process returns to S11 and processes of S11 through S14 is executed for the next page. Thus, the print data for driving the multifunction device 10 to operate for image printing are generated and transferred on a page by page basis. The process ends when the control unit 90 determines that the next page does not exist (S15: NO).

Figure 13:
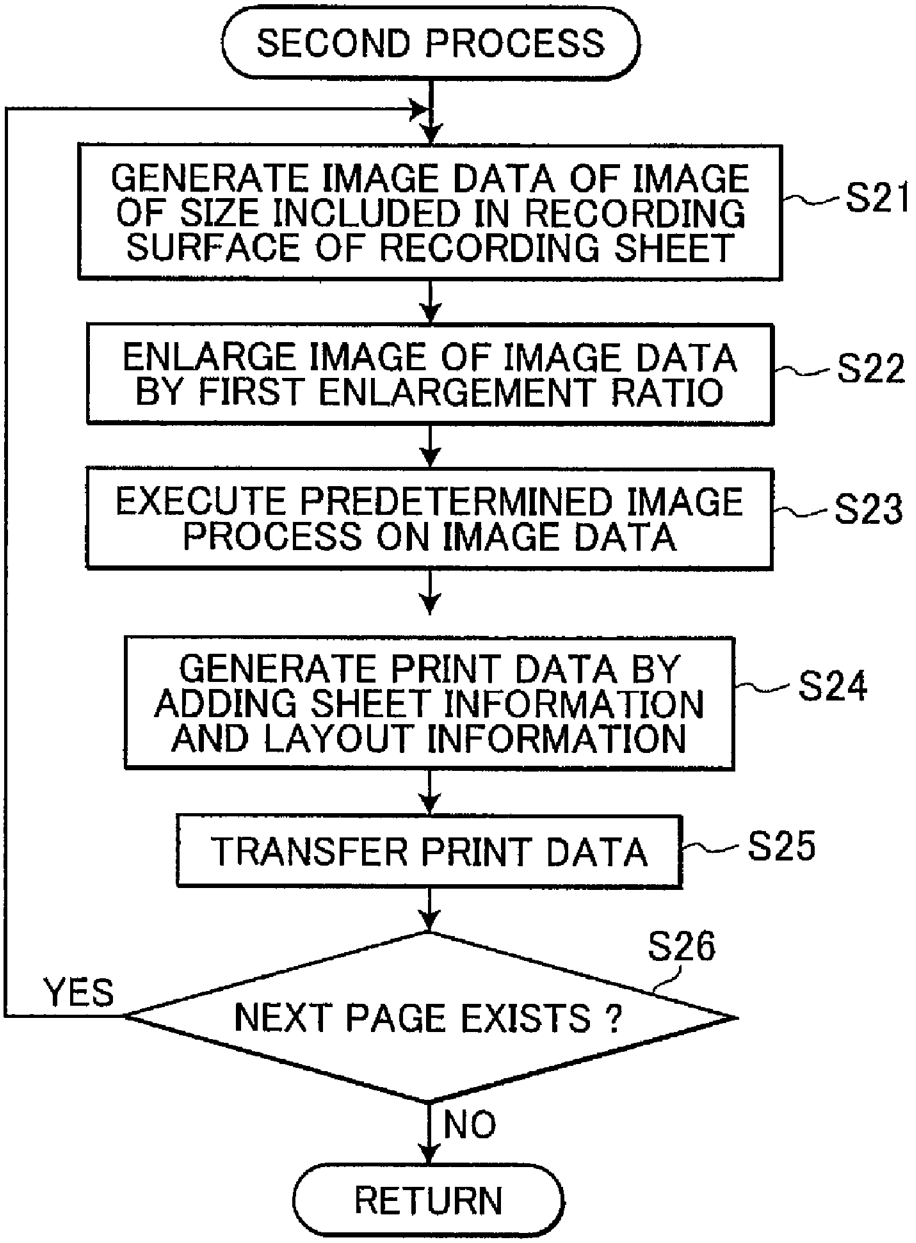
FIG. 13 is a detailed flowchart of a second process in FIG. 10.
Figure 14:
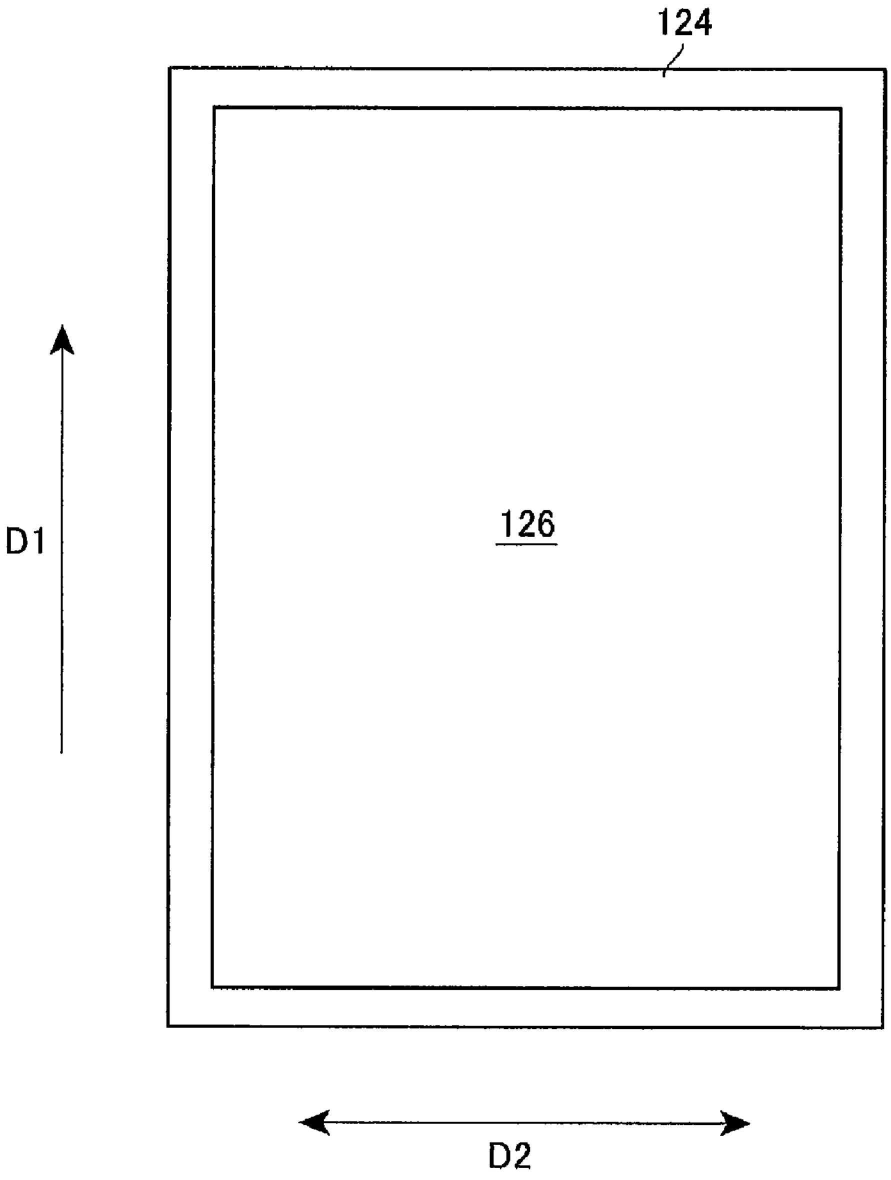
FIG. 14 is an explanatory diagram showing dimensional relationship between an image of print data and a recording surface of a recording sheet.

FIG. 13 is a detailed flowchart of the second process of S5 in FIG. 10. FIG. 14 is an explanatory diagram showing the dimensional relationship between an image 124 of print data and a recording surface 126 of a recording sheet. In the second process, the recording sheet may be conveyed slightly obliquely, and the recording surface 126 may be inclined slightly relative to the conveying direction D1 of the recording sheet. Note that, since the obliqueness of the recording sheet is very small, the recording surface 126 in FIG. 14 appears to be almost aligned (i.e., not inclined) to the conveying direction D1.

When the control unit 90 determines that determination in S4 is NO, that determination in S6 is text, that determination in S7 is plain paper, and that determination in S8 is the low resolution, the control unit 90 generates image data for an image of a size that is included in the recording surface of the recording sheet (S21). Note that the recording surface is the recording surface 126 that is not inclined relative to the conveying direction D1 of the recording sheet. The image data generated in S21 are multi-valued color image data of the RGB color system as in the case of the image data generated in 511. The control unit 90 executes an enlargement process of processing the image data with a first enlargement ratio (e.g., enlargement ratio of 1.1) to generate image data of the image 124 of a size including (larger than) the recording surface 126 of the recording sheet (S22). Regarding the enlargement process, if an image is simply enlarged, the resolution is decreased. Accordingly, in this embodiment, the resolution is maintained by interpolating image data.

Then, the control unit 90 executes a predetermined image process on the image data generated in S22 as in the case of the image data generated in S12 (S23). The control unit 90 generates print data by adding sheet information and layout information to the processed image data (S24). The control unit 90 then transfers the generated print data to the multifunction device 10 (S25). The multifunction device 10 records on the recording sheet a borderless image based on the print data transferred to the multifunction device 10 in S25. As shown in FIG. 14, the size of the image 124 of the print data is such that the image includes the recording surface 126 of the recording sheet. In other words, ink is ejected from the recording head 39 to an area including the outside regions of the recording sheet for recording a borderless image on the recording sheet.

Then, the control unit 90 determines whether the next page exists (S26). When the control unit 90 determines that the next page exists (S26: YES), the process returns to S21 and the processes of S21 through S25 are executed for the next page. Thus, the print data for driving the multifunction device 10 to operate for image printing are generated and transferred on a page by page basis. The process ends when the control unit 90 determines that the next page does not exist (S26: NO).

Figure 15:
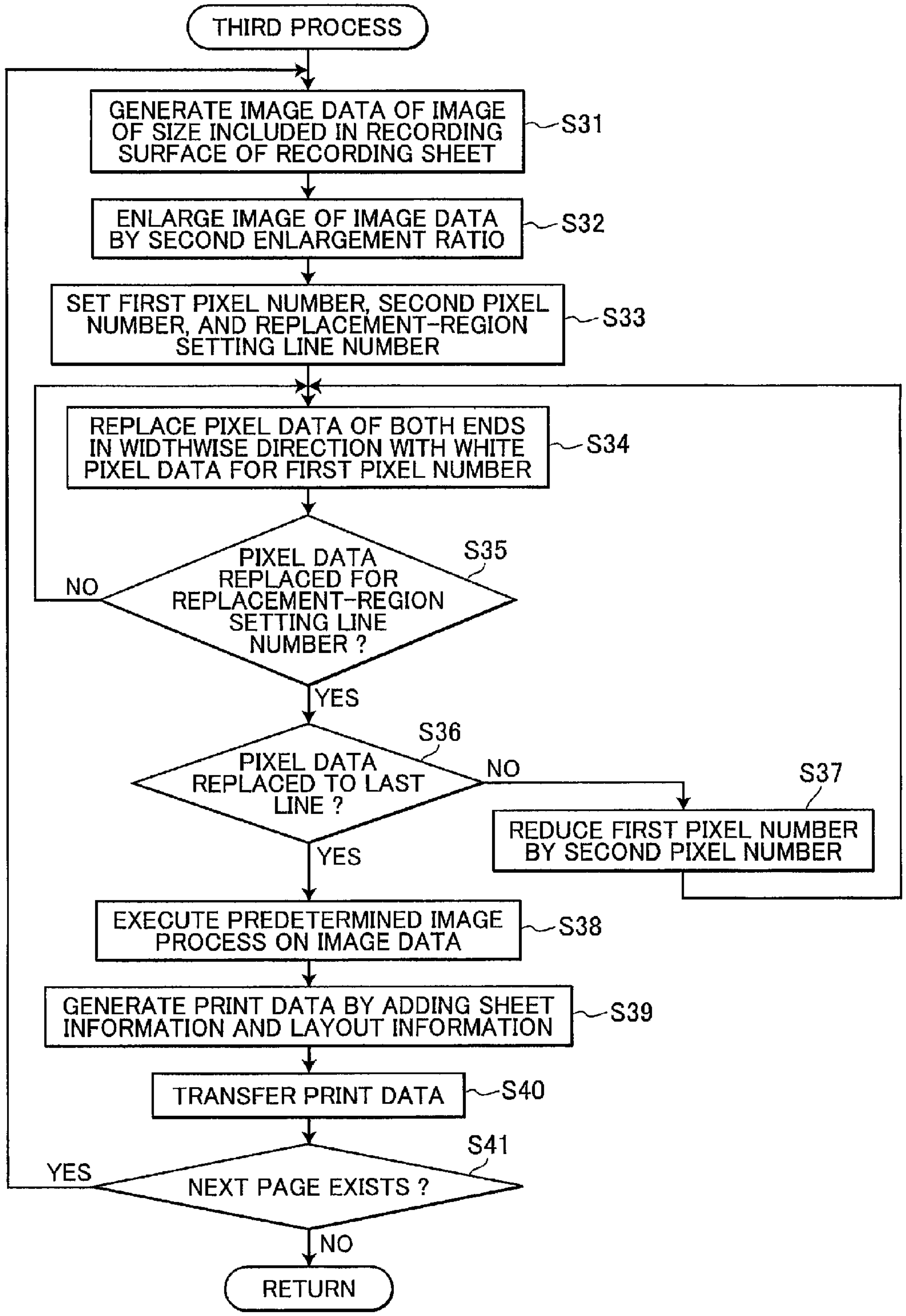
FIG. 15 is a detailed flowchart of a third process in FIG. 10.
Figure 16:
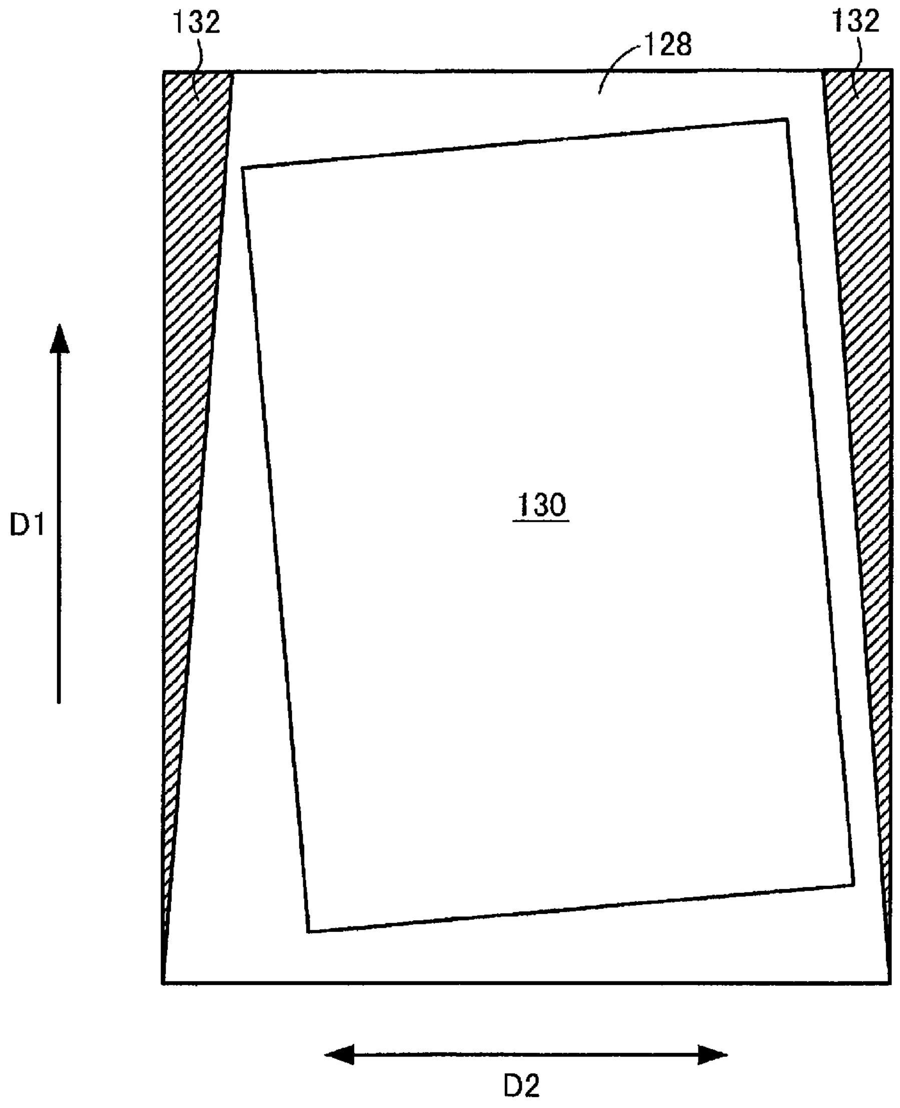
FIG. 16 is an explanatory diagram showing dimensional relationship between an image of print data and a recording surface of a recording sheet.
Figure 17:
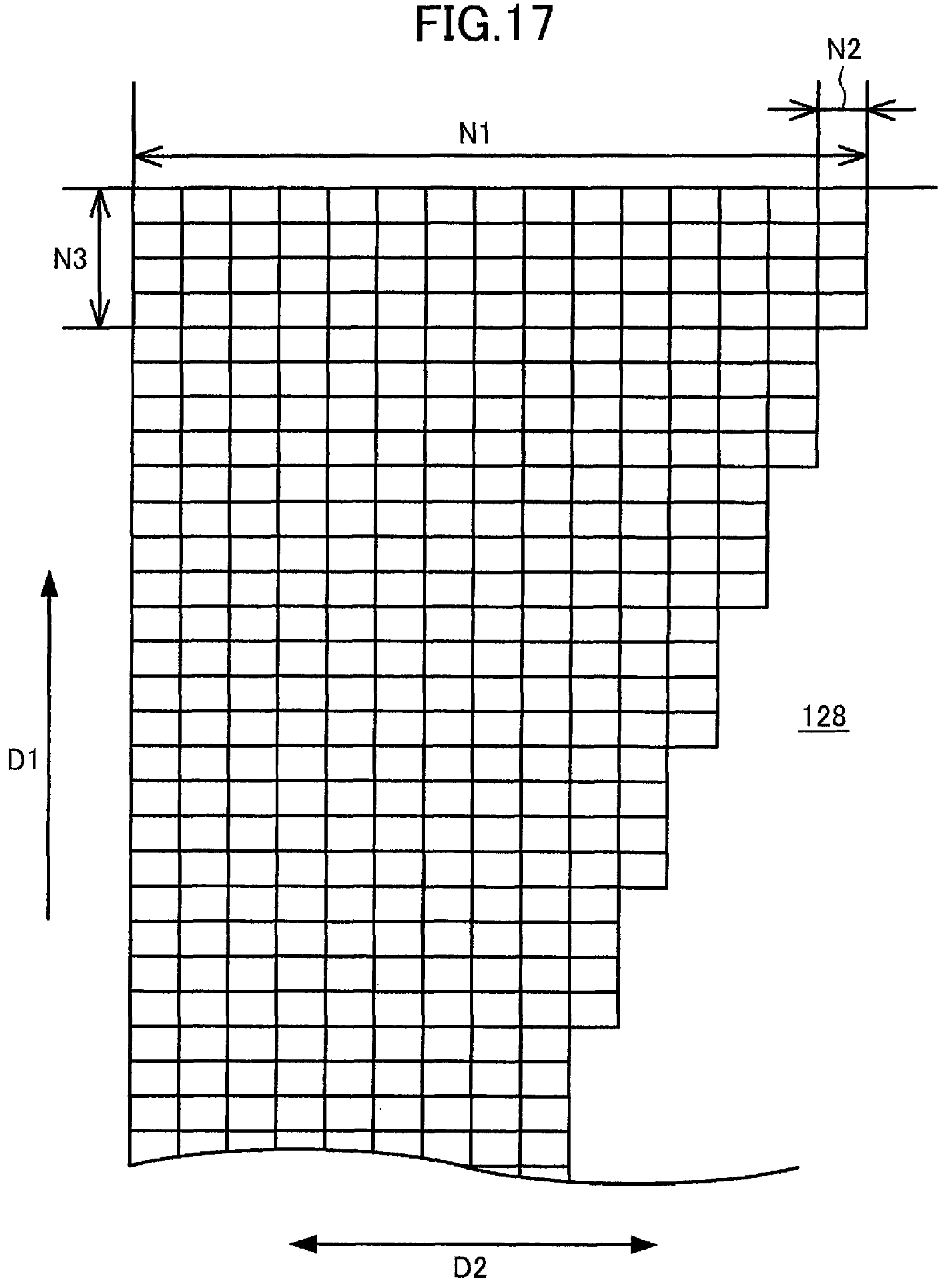
FIG. 17 is an explanatory diagram showing the number of first pixels, the number of second pixels, and the number of replacement-region setting lines.

FIG. 15 is a detailed flowchart of the third process of S9 in FIG. 10. FIG. 16 is an explanatory diagram showing the dimensional relationship between an image 128 of print data and a recording surface 130 of a recording sheet. FIG. 17 is an explanatory diagram showing a first pixel number N1, a second pixel number N2, and a replacement-region setting line number N3. Note that the recording sheet moves considerably obliquely and the recording surface 130 is inclined largely relative to the conveying direction D1 of the recording sheet in FIG. 16.

When determination in S8 is the high resolution, the control unit 90 generates image data for an image of a size that is included in the recording surface of the recording sheet (S31). Note that the recording surface is the recording surface 130 that is not inclined relative to the conveying direction D1 of the recording sheet. The image data generated in S31 are multi-valued color image data of the RGB color system as in the case of the image data generated in S11. The control unit 90 executes an enlargement process of processing the image data with a second enlargement ratio (e.g., enlargement ratio of 1.2) to generate image data of the image 128 of a size including the recording surface 130 of the recording sheet (S32). The enlargement process is the same process as described above.

As shown in FIG. 16, the image data included in replacement regions 132 are replaced by white pixel data (typically pixel data for blank) for the image 128 of the image data generated in S32. White pixel data are pixel data having predetermined color specification values (e.g. R, G, B=255, 255, 255). The control unit 90 sets the first pixel number N1, the second pixel number N2, and the replacement-region setting line number N3 for the replacement using pixel data (S33). The first pixel number N1 is the number of pixels in the widthwise direction D2 to be replaced by white pixel data (see FIG. 17). The replacement-region setting line number N3 is the number of lines in the conveying direction D1 for which the pixel data are to be replaced by white pixel data for the first pixel number N1 (see FIG. 17). The second pixel number N2 is the number of pixels of the pixel data in the widthwise direction D2 to be reduced after the replacement of the pixel data by the first pixel number N1 for the replacement-region setting line number N3 in the conveying direction D1 (see FIG. 17). The first pixel number N1, the second pixel number N2, and the replacement-region setting line number N3 that are set by the control unit 90 are stored in a predetermined region of the RAM 93. In an example shown in FIG. 17, the first pixel number N1, the second pixel number N2, and the replacement-region setting line number N3 are initially "15", "1", and "4", respectively. Note that the first pixel number N1, the second pixel number N2, and the replacement-region setting line number N3 can be modified depending on the print conditions set according to operation inputs from the operation section 95.

The control unit 90 replaces pixel data of both ends in the widthwise direction D2 by white pixel data by the first pixel number N1 (S34). For example, the control unit 90 changes the RGB values of the pixel data to be replaced to 255, 255, and 255. Then, the control unit 90 replaces the pixel data of the both ends in the widthwise direction D2 by the white pixel data. In a replacement region where the pixel data are replaced by white pixel data, drive signals for ejecting ink are not outputted to the head controller 33. The process of 534 is executed for each line in the widthwise direction D2.

The control unit 90 then determines whether the pixel data of the replacement-region setting line number N3 are replaced in the conveying direction D1 (S35). When the control unit 90 determines that the pixel data of the replacement-region setting line number N3 are not replaced (S35: NO), the process returns to S34. When the control unit 90 determines that the pixel data of the replacement-region setting line number N3 are replaced (535: YES), the control unit 90 determines whether the pixel data are replaced to the last line (S36). In other words, the control unit 90 determines whether the process of S34 is executed to all the lines in the conveying direction D1. When the control unit 90 determines that the pixel data are not replaced to the last line (S36: NO), the control unit 90 reduces the first pixel number N1 by the second pixel number N2 (S37). As illustrated in FIG. 17 as an example, the first pixel number N1 "15" is reduced by the second pixel number N2 "1". Hence, the first pixel number N1 is modified from "15" to "14" and the process returns to S34. The processes of S34 through S37 are repeated until determination in S36 becomes YES. The control unit 90 repeats the processes of S34 through S37 to replace the pixel data of the both ends in the widthwise direction D2 and reduce the number of pixels in the widthwise direction D2 from the downstream side toward the upstream side in the conveying direction D1. In this way, the pixel data included in the replacement regions 132 are replaced by white pixel data.

As can be seen from FIGS. 10 and 15, the series of replacement operations in the processes of S34 through S37 are executed under the conditions that the recording sheet is larger than the predetermined size, that the type of image is photograph, that the recording sheet is glossy paper or inkjet paper, and that the image to be recorded on the recording sheet is an image of the high resolution. Although the pixel data are replaced when all of the above conditions are satisfied in this embodiment, the conditions are not limited to this. For example, the pixel data may be replaced under the condition that the recording sheet is determined to be larger than a predetermined size regardless of the other print conditions. Alternatively, the pixel data may be replaced under the condition that the recording sheet is determined to be glossy paper or inkjet paper regardless of the other print conditions. In short, the process of replacing the pixel data of the both ends in the widthwise direction D2 by white pixel data can be executed when at least one of the conditions of the size of the recording sheet, the type of image, the type of the recording sheet, and the resolution is satisfied.

The control unit 90 appropriately changes the first pixel number N1, the second pixel number N2, and/or the replacement-region setting line number N3 depending on the set print conditions. In other words, the control unit 90 changes a gradient by which the control unit 90 reduces the number of pixels at least according to the size of the recording sheet, the type of image, the type of the recording sheet, or the resolution of the image to be recorded on the recording sheet. The gradient is determined by a combination of the first pixel number N1, the second pixel number N2, and the replacement-region setting line number N3.

When the control unit 90 determines that the pixel data are replaced to the last line (S36: YES), the control unit 90 executes a predetermined image process similar to that of S12 on the image data (S38). The control unit 90 generates print data by adding sheet information and layout information to the image data (339). The control unit 90 then transfers the generated print data to the multifunction device 10 (S40). The multifunction device 10 records an image on the recording sheet according to the print data transferred to the multifunction device 10 in S40.

Then, the control unit 90 determines whether the next page exists (S41). When the control unit 90 determines that the next page exists (S41: YES), the process returns to S31 and the processes of S31 through S40 are executed for the next page. Thus, the print data for driving the multifunction device 10 to operate for image printing are generated and transferred on a page by page basis. The process ends when the control unit 90 determines that the next page does not exist (S41: NO).

As shown in FIG. 16, the image 128 of the print data is larger than and includes the recording surface 130 of the recording sheet. The pixel data of the image 128 at the both ends in the widthwise direction D2 (replacement regions 132) are replaced by white pixel data and the number of white pixel data is reduced from the downstream side toward the upstream side in the conveying direction D1. The multifunction device 10 ejects ink from the recording head 39 over an area including regions outside of the recording sheet (that is, an area including regions outside of the recording surface 130) based on the print data of the image 128 to record a borderless image on the recording sheet.

As described above, the terminal apparatus 70 generates image data for the image 128 that is larger than and includes the recording surface 130 of the recording sheet. The pixel data of the image data that correspond to the both ends in the widthwise direction D2 are replaced by white pixel data. As shown in FIG. 16, the pixel data are replaced by white pixel data in such a way that the number of pixels in the widthwise direction D2 is reduced from the downstream side toward the upstream side in the conveying direction D1. Thus, the print data are generated in the terminal apparatus 70. Then, the print data are transferred to the multifunction device 10 and the image of the print data is printed as borderless image on the recording surface 130 of the recording sheet by the multifunction device 10. The width of the image is increased from the downstream side (the leading end side of the recording sheet) where the influence of oblique conveyance is relatively small toward the upstream side (the trailing end side of the recording sheet) where the influence of oblique conveyance is relatively large in the conveying direction D1 (see FIG. 16). Hence, when the multifunction device 10 records a borderless image, one or more regions where no image is recorded can be prevented effectively from appearing without providing a sensor for detecting an amount of displacement of the recording sheet due to an oblique conveyance. The image to be recorded is expanded to the outside only in regions where the image can be effectively prevented from being unrecorded on the recording sheet. Thus, the inconvenience that the platen 42 is stained by ejected ink and that an amount of ink mist is increased can be minimized.

Whether an oblique conveyance may or may not occur depends on the print conditions. A degree of oblique conveyance also depends on the print conditions. However, the process of replacing the pixel data of the both ends by white pixel data is executed whenever necessary by setting print conditions where an oblique conveyance is likely to occur as predetermined conditions. Additionally, the gradient by which the number of pixels of the pixel data to be replaced is reduced can be modified depending on the print conditions. Thus, the process of replacing the pixel data of the both ends with white pixel data is executed effectively.

Second Embodiment

An image recording apparatus according to a second embodiment of the invention will be described while referring to FIGS. 18 and 19, wherein like parts and components are designated by the same reference numerals to avoid duplicating description.

In the second embodiment, firmware (an image recording program) is stored in the multifunction device 10 in place of installing a printer driver in the terminal apparatus 70. In other words, the firmware installed from the terminal apparatus 70 via the LAN 31 is stored in the EEPROM 104 of the multifunction device 10. The control unit 100 reads out the firmware from the EEPROM 104 executes the firmware.

Figure 18:
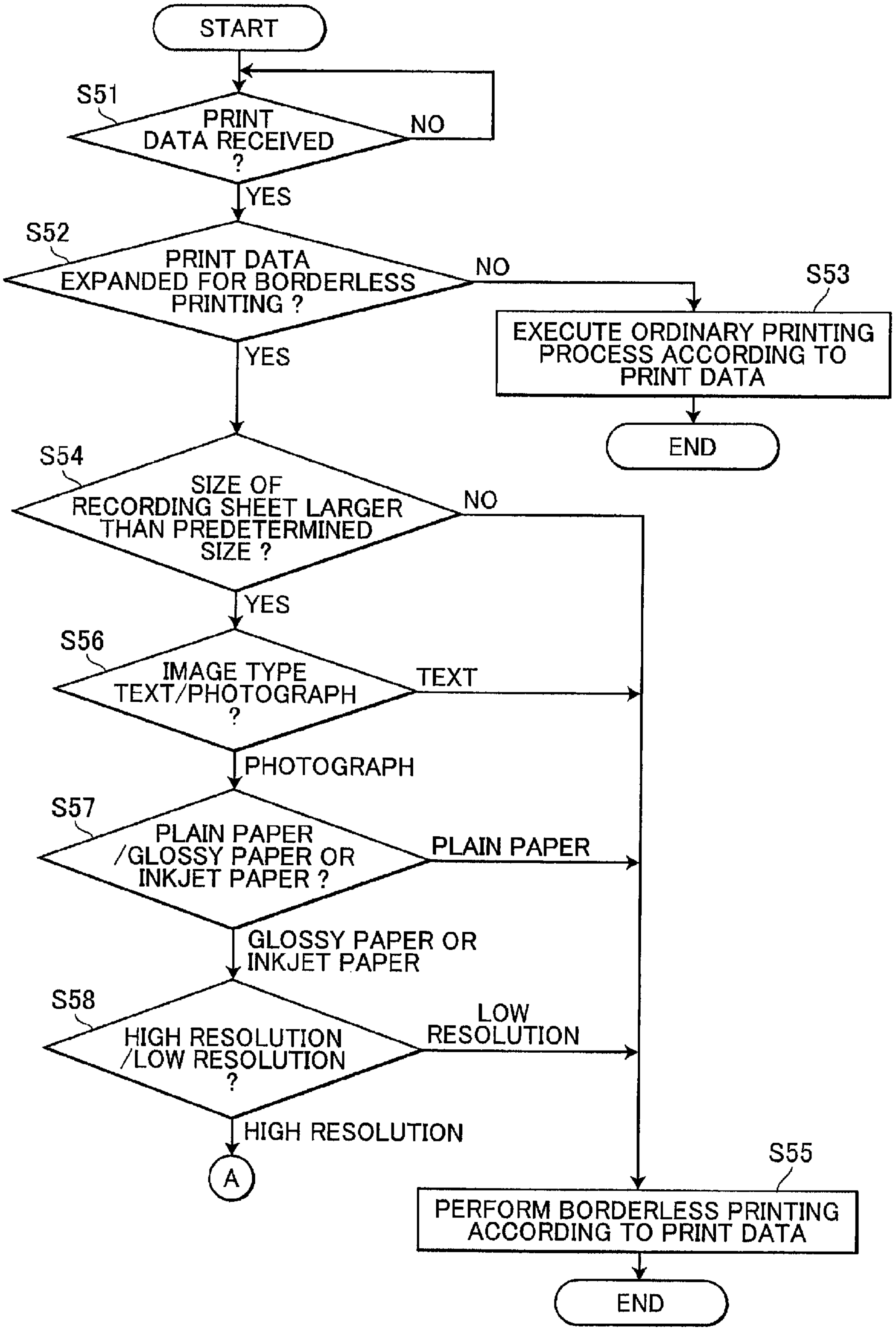
FIG. 18 is a flowchart of part of a process that is executed by a multifunction device according to a second embodiment of the invention, when print data are received for borderless printing.
Figure 19:
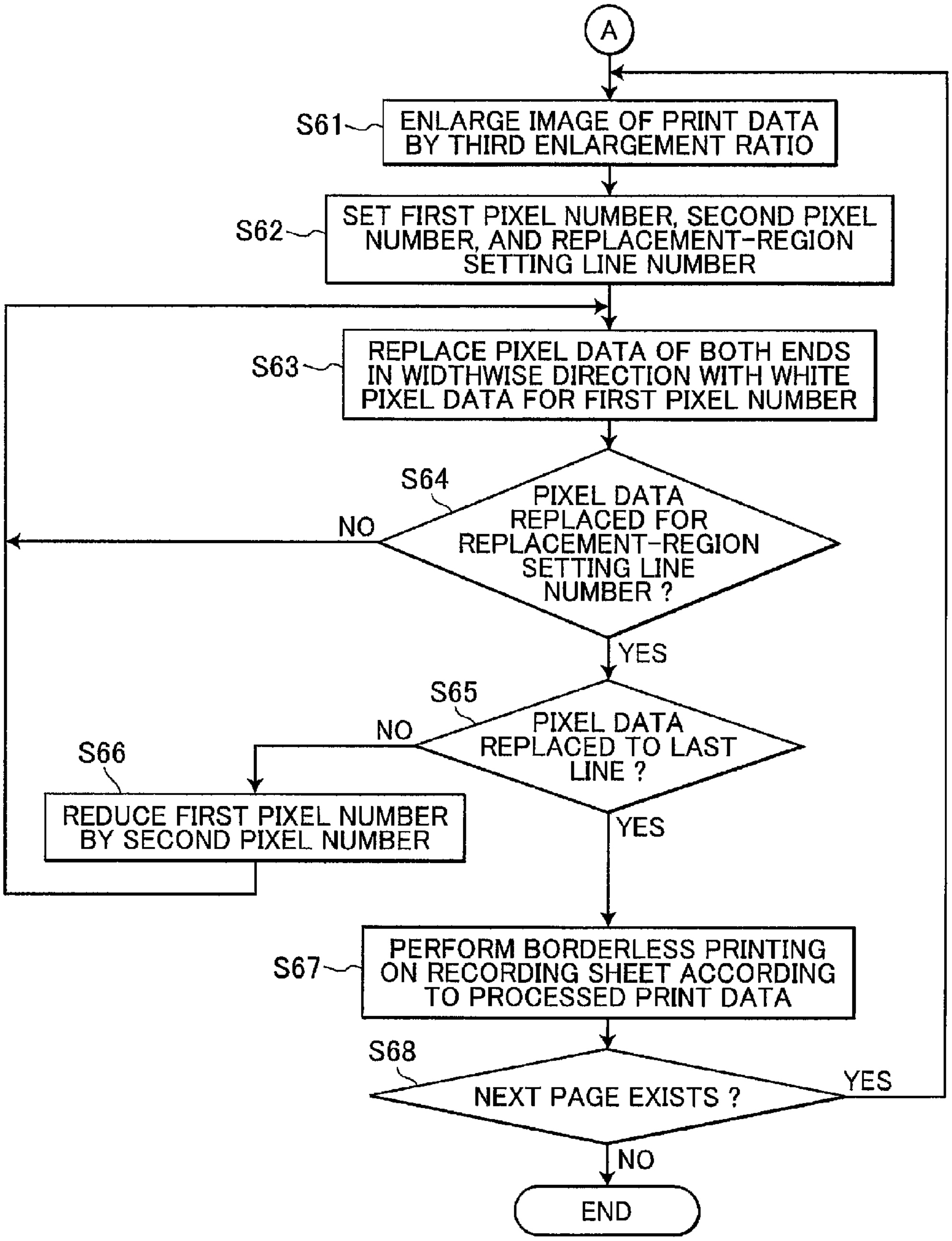
FIG. 19 is a flowchart of another part of the process shown in FIG. 18.

FIGS. 18 and 19 are flowcharts of a process that is executed by the multifunction device 10 when print data are received. The process of the multifunction device 10 described below by referring to FIGS. 18 and 19 is executed according to the commands that the control unit 100 issues based on the firmware stored in the EEPROM 104. The process of the multifunction device 10 described below is partly similar to the third process of FIG. 15. Therefore, the processes of FIGS. 18 and 19 that are similar to those of FIG. 15 will not be described any further and only the different processing steps will be described below.

The terminal apparatus 70 generates print data and transfers the print data to the multifunction device 10. The print data are for an image included in the recording surface of the recording sheet regardless whether borderless recording is specified. The control unit 100 of the multifunction device 10 determines whether the control unit 100 receives the print data transferred from the terminal apparatus 70 (S51). The control unit 100 moves to a standby state when the control unit 100 determines that the control unit 100 has not received the print data (S51: NO). When the control unit 100 determines that the control unit 100 receives the print data (S51: YES), the control unit 100 then determines whether the print data are for an enlarged image for borderless recording (S52). In other words, the control unit 100 determines whether the size of the image of the print data includes the recording surface of the recording sheet to be used for recording the image, based on the print data the control unit 100 has received. When the control unit 100 determines that the print data are not for an enlarged image for borderless recording (S52: NO), the control unit 100 executes an ordinary printing process according to the print data (S53). In other words, the control unit 100 controls the image recording unit 124 to record the image 120 of the print data on the recording surface 122 so as to produce a margin along the periphery of the recording surface 122.

When the control unit 100 determines that the print data are for an enlarged image for borderless recording, that is, the control unit 100 receives the print data of an image of a size including (larger than) the recording surface of the recording sheet (S52: YES), the control unit 100 stores the print data in a predetermined region of the RAM 103 (first step). Then, the control unit 100 determines whether the size of the recording sheet is larger than the predetermined size (e.g., A4 size) (S54). When the control unit 100 determines that the size of the recording sheet is not larger than the predetermined size (S54: NO), the control unit 100 records a borderless image on the recording sheet according to the print data acquired from the terminal apparatus 70 (S55). The borderless recording is executed when it is expected that the recording sheet is not conveyed obliquely, or when the recording sheet is conveyed slightly obliquely. In other words, borderless recording is performed in S55 only when there is no risk that an unprinted region appears on the recording sheet even if ordinary borderless recording is conducted.

When the control unit 100 determines that the size of the recording sheet is larger than the predetermined size (S54: YES), the control unit 100 then determines whether the image of the print data is text or photograph according to the information contained in the acquired print data (S56). The process proceeds to S55 when the control unit 100 determines that the image of the print data is text (S56: text). When the control unit 100 determines that the image of the print data is photograph (S56: photograph), the control unit 100 then determines whether the recording sheet is plain paper, or glossy paper or inkjet paper (S57). The process proceeds to S55 when the control unit 100 determines that the type of the recording sheet is plain paper (S57: plain paper).

When the control unit 100 determines that the type of the recording sheet is glossy paper or inkjet paper (S57: glossy paper or inkjet paper), the control unit 100 then determines whether the specified resolution is the high resolution or the low resolution (S58). The process proceeds to S55 when the control unit 100 determines that the specified resolution is the low resolution (S58: low resolution). When the control unit 100 determines that the specified resolution is the high resolution (S58: high resolution), the control unit 100 then enlarges the image of the print data by a third enlargement ratio (e.g., enlargement ratio of 1.1) (S61). As a result, the print data of the image 128 (see FIG. 16) before the pixel data of the replacement regions 132 (see FIG. 16) are replaced by white pixel data is obtained.

The control unit 100 then sets the first pixel number N1, the second pixel number N2, and the replacement-region setting line number N3 (S62). The first pixel number N1, the second pixel number N2, and the replacement-region setting line number N3 are similar to those set in S33 (see FIG. 15). The first pixel number N1, the second pixel number N2, and the replacement-region setting line number N3 are then stored in a predetermined area of the RAM 103. Note that the first pixel number N1, the second pixel number N2, and the replacement-region setting line number N3 is changed depending on the print conditions contained in the print data acquired from the terminal apparatus 70.

The control unit 100 replaces the pixel data of the both ends in the widthwise direction D2 by white pixel data for the first pixel number N1 (S63). The process of S63 is executed in a manner similar to the process of S34. The control unit 100 then determines whether the pixel data of the replacement-region setting line number N3 are replaced in the conveying direction D1 (S64). When the control unit 100 determines that the pixel data of the replacement-region setting line number N3 are not replaced (S64: NO), the process returns to S63. When the control unit 100 determines that the pixel data of the replacement-region setting line number N3 are replaced (S64: YES), the control unit 100 determines whether the pixel data are replaced to the last line (S65). In other words, the control unit 100 determines whether the process of S63 is executed to all the lines in the conveying direction D1. When the control unit 100 determines that the pixel data are not replaced to the last line (S65: NO), the control unit 100 reduces the first pixel number N1 by the second pixel number N2 (S66). The processes of S63 through S66 are repeated until determination in S65 becomes YES. The control unit 100 repeats the processes of S63 through S66 to replace the pixel data of the both ends in the widthwise direction D2 by white pixel data and to reduce the number of pixels in the widthwise direction. D2 from the downstream side toward the upstream side in the conveying direction D1 (second step). In this way, the control unit 100 relatively expands the width of the image that the image recording unit 24 records in the widthwise direction D2 from the downstream side toward the upstream side in the conveying direction D1 (see S16). In this way, the print data of the image as shown in FIG. 16 is acquired by the multifunction device 10.

The processes in S63 through S66 are executed under the conditions that the recording sheet is larger than the predetermined size, that the type of image is photograph, that the specified recording sheet is glossy paper or inkjet paper, and that the image to be recorded on the recording sheet is an image of the high resolution. However, the conditions are not limited to this. The control unit 100 can execute the process of replacing the pixel data of the both ends in the widthwise direction D2 when at least one of the conditions of the size of the recording sheet, the type of image, the type of the recording sheet, and the resolution is satisfied.

It is expected that an amount of displacement of the recording sheet due to an oblique conveyance varies depending on the size and the type of the recording sheet. Therefore, the control unit 100 may be configured to change a gradient by which the control unit 100 reduces the number of pixels according to at least one of the size of the recording sheet, the type of image, the type of the recording sheet, and the resolution of the image to be recorded on the recording sheet. The gradient can be changed with ease by changing the first pixel number N1, the second pixel number N2, and/or the replacement-region setting line number N3.

The control unit 100 records a borderless image on the recording sheet according to the print data on which a process of replacing the pixel data of the both ends by white pixel data has been performed (S67, third step). The control unit 100 determines whether the next page exists (S68). When the control unit 100 determines that the next page exists (S68: YES), the process returns to S61 and the process of S61 and subsequent steps are executed for the next page. Thus, the print data acquired from the terminal apparatus 70 are subjected to a process of replacing the pixel data of the both ends by white pixel data and a printing process one page at a time. The process ends when the control unit 90 determines that the next page does not exist (S68: NO).

Thus, with the multifunction device 10 according to the second embodiment, the recording sheet is conveyed in a predetermined conveying direction D1 along the conveying path 23. During this conveyance, a borderless image is recorded on the recording sheet by the image recording unit 24 according to print data. The print data is for an image of a size that includes the recording surface of the recording sheet to be used for printing. Therefore, the image of the print data is recorded partly at the outside of the recording surface of the recording sheet. The recording sheet conveyed during the recording operation may be conveyed obliquely. When the recording sheet is conveyed obliquely, the influence of oblique conveyance is relatively large at the upstream side than at the downstream side in the conveying direction D1. In other words, an amount of displacement of the recording sheet is larger at the upstream side than at the downstream side in the conveying direction D1. The length in the widthwise direction D2 of the image recorded by the image recording unit 24 is relatively expanded from the downstream side toward the upstream side in the conveying direction D1 relative to the recording sheet. Thus, the width of the image is increased from the downstream side where the influence of oblique conveyance is relatively small toward the upstream side where the influence of oblique conveyance is relatively large in the conveying direction D1. Hence, when the multifunction device 10 records a borderless image, a region where no image is recorded can be effectively prevented from appearing without providing a sensor for detecting an amount of displacement of the recording sheet due to an oblique conveyance.

The print data is for an image that is expanded to the outside of the recording surface of the recording sheet. In other words, the image of the print data is sufficiently wide relative to the recording surface of the recording sheet. The pixel data of the both ends in the widthwise direction D2 of the image of the print data are replaced by white pixel data. The number of pixels of the pixel data that are replaced in the widthwise direction D2 is reduced from the downstream side toward the upstream side in the conveying direction D1. Thus, due to the image processing operations in S63 through S66, the image of the print data is expanded from the downstream side where the influence of oblique conveyance on the width in the widthwise direction D2 is relatively small toward the upstream side where the influence of oblique conveyance is relatively large.

Whether to replace the pixel data of the both ends by white pixel data is switched according to the print conditions. The process of replacing the pixel data of the both ends by white pixel data can be executed whenever necessary by setting print conditions where an oblique conveyance is likely to occur as predetermined conditions. An amount of displacement of the recording sheet that appears due to oblique conveyance may vary between plain paper and glossy paper. However, since the gradient by which the number of pixels of the pixel data to be replaced is reduced is modified depending on the print conditions, the process of replacing the pixel data of the both ends by white pixel data is executed effectively.

The image to be recorded is expanded to the outside only in a region where the image can be effectively prevented from being unrecorded on the recording sheet. Thus, the risk that the platen 42 is stained by ejected ink and that an amount of ink mist increases can be minimized.

While the pixel data of the both ends in the widthwise direction D2 are replaced by white pixel data in the above-described first and second embodiments, pixel data other than white pixel data may be used for blank areas. Alternatively, pixel data having no color specification values (RGB values) may alternatively be used. Such pixel data provide a similar effect of not recording any image on the recording sheet. Therefore, replacement pixel data do not record any image on the recording sheet.

Third Embodiment

Figure 20:
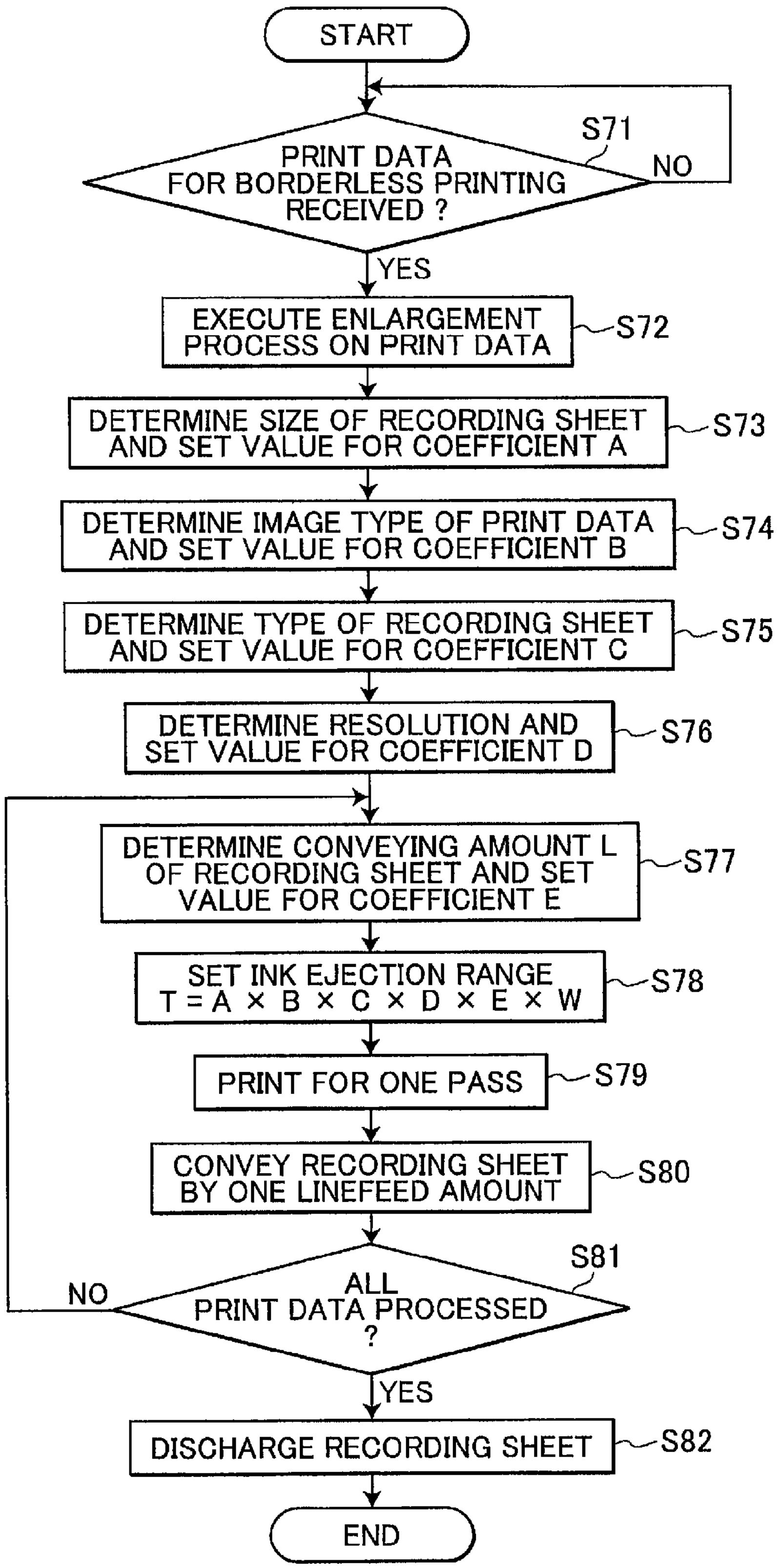
FIG. 20 is a flowchart showing a process that is executed by a multifunction device according to a third embodiment of the invention, when image data are received for borderless printing.
Figure 22:
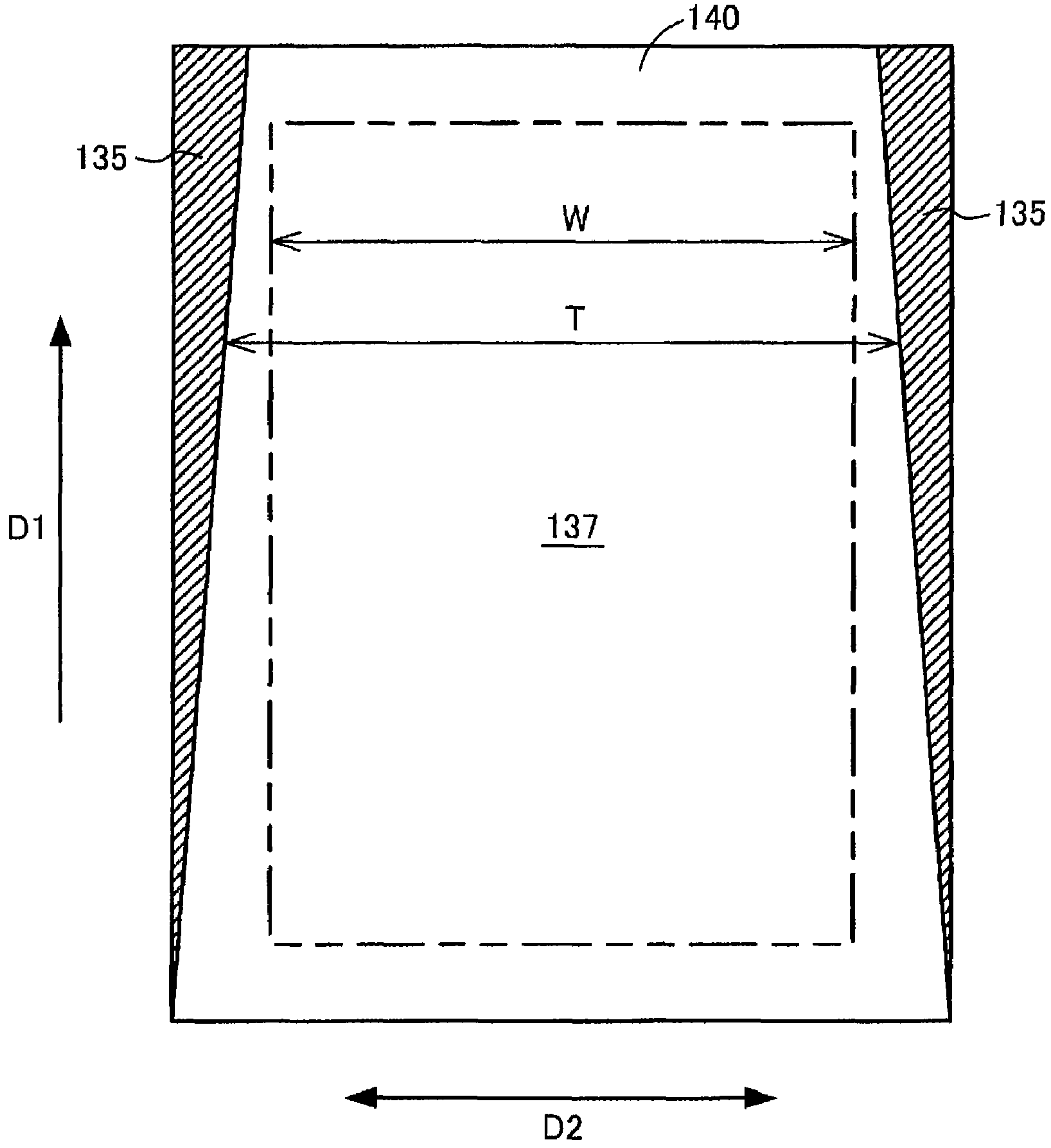
FIG. 22 is an explanatory diagram showing an ink ejection range of a recording head of the third embodiment.

An image recording apparatus according to a third embodiment of the invention will be described while referring to FIGS. 20 through 22, wherein like parts and components are designated by the same reference numerals to avoid duplicating description.

In the third embodiment, firmware (an image recording program) is stored in the multifunction device 10 in place of installing a printer driver in the terminal apparatus 70. In other words, the firmware installed from the terminal apparatus 70 via the LAN 31 is stored in the EEPROM 104 of the multifunction device 10. The control unit 100 reads out the firmware from the EEPROM 104 and executes the firmware. FIG. 20 is a flowchart showing a process that is executed by the multifunction device 10 of the third embodiment when print data for borderless recording are received. FIGS. 21A through 21E are explanatory diagrams showing setting tables 111 through 115. FIG. 22 is an explanatory diagram showing an ink ejection range T of the recording head 39 of the third embodiment. Note that the process of the multifunction device 10 according to the third embodiment will be executed according to the commands that the control unit 100 issues based on the firmware stored in the EEPROM 104.

The control unit 100 determines whether the print data for borderless recording (borderless printing) that are transferred from the terminal apparatus 70 are received (S71). The print data for borderless recording as used here are print data of an image of a size that includes (is larger than) the recording surface of the recording sheet. The control unit 100 moves to a standby state when the control unit 100 determines that the print data for borderless recording are not received (S71: NO). When the control unit 100 determines that the print data for borderless recording are received (S71: YES), the control unit 100 stores the print data in a predetermined area of the RAM 103. The control unit 100 processes the print data so as to enlarge the size of the image of the print data by the enlargement process described above, and generates print data of an image 140 (see FIG. 22) (S72, first step). A borderless image is recorded on a recording sheet (borderless recording) according to the print data in this embodiment.

The setting tables 111 through 115 (see FIGS. 21A through 21E) are stored in the EEPROM 104. The setting tables 111 through 115 store print conditions and coefficients A through E in association with each other. The coefficients A through E are employed when computing the ink ejection range T (see FIG. 22), which will be described in greater detail hereinafter. The setting table 111 stores the sizes of recording sheet that can be specified by the terminal apparatus 70 in association with corresponding respective values of the coefficient A (see FIG. 21A). The setting table 112 stores the types of image that can be indicated by print data in association with corresponding respective values of the coefficient B (see FIG. 21B). The setting table 113 stores the types of recording sheet in association with corresponding respective values of the coefficient C (see FIG. 21C). The setting table 114 stores the resolutions that can be used for recording an image on a recording sheet in association with corresponding respective values of the coefficient D (see FIG. 21D). The setting table 115 stores conveying amounts (conveying distances) of the recording sheet since a start of borderless recording in association with corresponding respective values of the coefficient E (see FIG. 21E).

The control unit 100 sets a value for the coefficient A after determining the size of recording sheet (S73). More specifically, the control unit 100 determines the size of recording sheet specified by the terminal apparatus 70 according to the related information contained in the print data received from the terminal apparatus 70. Then, the control unit 100 reads the value of the coefficient A that corresponds to the determined size of recording sheet from the setting table 111 and sets the value for the coefficient A. The information on the set value of the coefficient A is temporarily stored in the RAM 103.

The control unit 100 sets a value for the coefficient B after determining the type of image of the print data (S74). More specifically, the control unit 100 determines the type of image of the print data according to the related information contained in the print data received from the terminal apparatus 70. Then, the control unit 100 reads the value of the coefficient B that corresponds to the determined type of image from the setting table 112 and sets the value for the coefficient B. The information on the set value of the coefficient B is temporarily stored in the RAM 103.

The control unit 100 sets a value for the coefficient C after determining the type of recording sheet (S75). More specifically, the control unit 100 determines the specified type of recording sheet according to the related information contained in the print data received from the terminal apparatus 70. Then, the control unit 100 reads the value of the coefficient C that corresponds to the determined type of recording sheet from the setting table 113 and sets the value for the coefficient C. The information on the set value of the coefficient C is temporarily stored in the RAM 103.

The control unit 100 sets a value for the coefficient D after determining the resolution (S76). More specifically, the control unit 100 determines the resolution specified by the terminal apparatus 70 according to the related information contained in the print data received from the terminal apparatus 70. Then, the control unit 100 reads the value of the coefficient D that corresponds to the determined resolution from the setting table 114 and sets the value for the coefficient D. The information on the set value of the coefficient D is temporarily stored in the RAM 103.

The control unit 100 sets a value for the coefficient E after determining a conveying amount (conveying distance) of the recording sheet (S77). More specifically, the control unit 100 determines the conveying amount of the recording sheet based on detection results of the rotary encoder 83 (see FIG. 7). The conveying amount is zero before the start of borderless recording. The control unit 100 reads the value of the coefficient E that corresponds to the determined conveying amount from the setting table 115 and sets the value for the coefficient E. For example, 1.02 is set for the coefficient E when the conveying amount is 6.5 cm (see FIG. 21E). The information on the set value of the coefficient E is temporarily stored in the RAM 103.

The control unit 100 then sets the ink ejection range T according to the set values of the coefficients A through E and a width W of a virtual sheet 137 (S78). More specifically, the control unit 100 multiplies the coefficients A through E and the width W with one another. The information (value) on the ink ejection range T is temporarily stored in a register (not shown) is provided in the head controller 33.

When the ink ejection range T is set, the control unit 100 executes printing for one pass (S79). More specifically, the control unit 100 drives the recording head 39 to selectively eject ink for recording an image on the recording sheet while the control unit 100 drives the carriage 38 to reciprocate one time in the main scanning direction. The process of S79 is executed according to the print data generated in the process of S72. The control unit 100 controls the LF motor 85 to convey the recording sheet for one linefeed amount (S80).

Then, the control unit 100 determines whether all the print data are processed (S81). More specifically, the control unit 100 determines whether the process of S79 has been executed on all the pixel data of the print data generated in 372. The process returns to S77 when the control unit determines that the processing operation has not been executed on all the print data (S81: NO). In other words, the processes of S77 through S80 (second step) are repeated until determination in S81 becomes YES. In this way, the control unit 100 controls the recording head 39 (which is scanned in the widthwise direction D2) to eject ink onto the recording sheet based on the print data while the recording sheet is conveyed in the conveying direction D1, thereby recording a borderless image.

Note that the value of the coefficient E (see FIG. 21E) gradually increases as the recording sheet is conveyed. Therefore, the ink ejection range T is broadened as the processes of S77 through S80 are repeated. Hence, the length in the widthwise direction D2 of the image is expanded from the downstream side toward the upstream side in the conveying direction D1 (see FIG. 22). In other words, the processes of S77 through S78 correspond to the third step. In FIG. 22, an ejection prohibited area 135 is a region where ink is not ejected from the recording head 39. More specifically, ejection prohibiting signals (signals for prohibiting ink ejection onto the ejection prohibited area 135) are inputted to the head controller 33, so that drive signals for ejecting ink are not outputted to the recording head 39. In other words, the ejection prohibited area 135 is out of the ink ejection range set in S78. Therefore, ink is not ejected from the recording head 39 onto the ejection prohibited area 135 if pixel data of the print data that correspond to the ejection prohibited area 135 are input to the head controller 33.

A gradient by which the ink ejection range T is broadened is set according to the coefficients A through E. In other words, the gradient is changed according to the size of the recording sheet to be used for the printing, the type of the image indicated by the print data, the type of the recording sheet, the resolution of the image being recorded on the recording sheet, and the conveying amount of the recording sheet since the image recording unit 24 starts recording. Note, however, that the gradient by which the ink ejection range T is broadened may be changed based on at least one of the above-described print conditions. In other words, the gradient should not necessarily be changed based on all of the print conditions. For example, only the setting table 111 may be used and the ink ejection range may be determined only based on the size of the recording sheet.

The influence of oblique conveyance of a recording sheet increases from the downstream side toward the upstream side in the conveying direction D1. In this embodiment, the range by which ink is ejected from the recording head 39 in the widthwise direction D2 (the ink ejection range T) is gradually broadened from the downstream side toward the upstream side. With this configuration, a region where no image is recorded can be effectively prevented from appearing at the upstream side in the conveying direction (lower side in FIG. 22) on the recording surface of the recording sheet.

An amount of displacement of the recording sheet due to an oblique conveyance varies depending on the print conditions. For instance, an amount of displacement of the recording sheet is greater when the recording sheet is glossy paper than when the recording sheet is plain paper. In this embodiment, the gradient by which the ink ejection range is broadened is determined according to the setting tables 111 through 115. Thus, the process of broadening the ink ejection range is effectively executed according to the print conditions. The image to be recorded is expanded to the outside only in a region where the image can be effectively prevented from being unrecorded on the recording sheet. Thus, the risk that the platen 42 is stained by ejected ink and that an amount of ink mist increases can be minimized.

While the invention has been described in detail with reference to the above aspects thereof, it would be apparent to those skilled in the art that various changes and modifications may be made therein without departing from the scope of the claims.

For example, in the above-described first through third embodiments, a trapezoidal shape (see FIG. 16, for example) having a top side and a bottom side located respectively at the downstream side and at the upstream side is used for the image to be recorded by the image recording unit 24. However, the image to be recorded is not limited to such a shape.

Figure 23B:
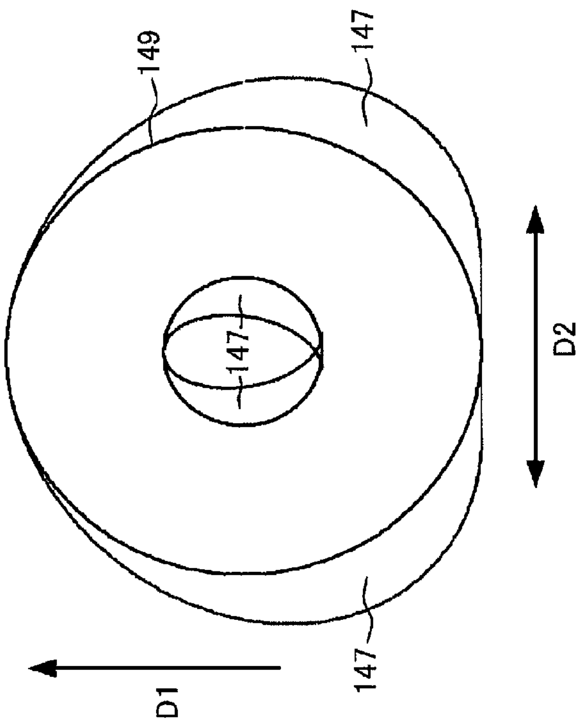
FIG. 23B is an explanatory diagram showing an image recorded by an image recording unit according to the modification, wherein a recording medium is a compact disc.
Figure 23A:
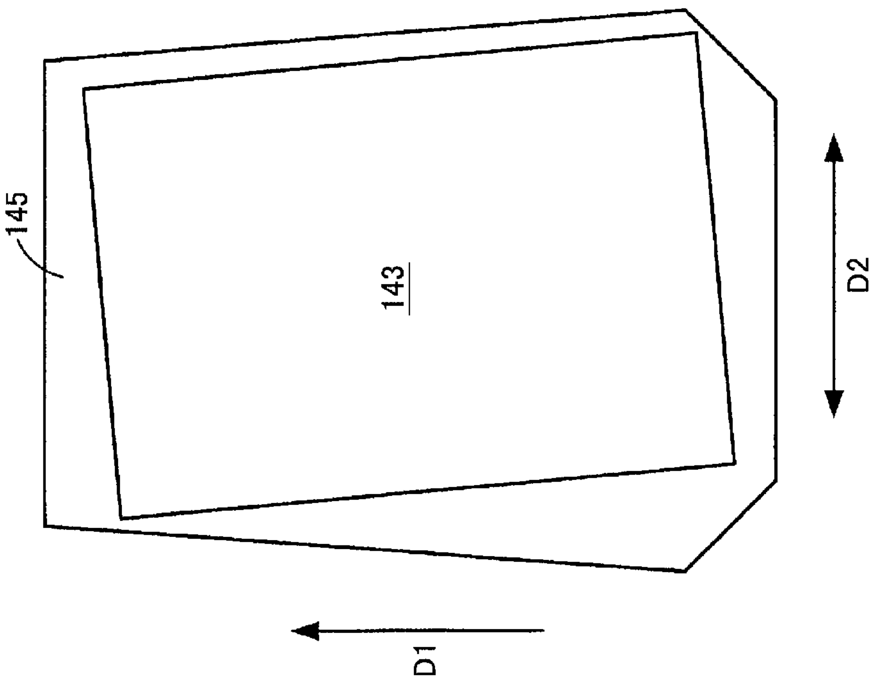
FIG. 23A is an explanatory diagram showing an image recorded by an image recording unit according to a modification, wherein a recording medium is a rectangular recording sheet.

FIGS. 23A and 23B illustrate deformed images recorded by the image recording unit 24 according to a modification. FIG. 23A is an explanatory diagram showing a recording medium that is a recording sheet. FIG. 23B is an explanatory diagram showing a recording medium that is a CD.

If a rectangular recording sheet is conveyed obliquely to a large extent and a recording surface 143 is inclined as shown in FIG. 23A, the probability of producing a region where no image is recorded at the opposite ends in the widthwise direction D2 is low at the upstream side in the conveying direction D1. Therefore, an image 145 to be recorded by the image recording unit 24 may have a shape produced by cutting off two corners of the opposite ends in the widthwise direction D2 at the upstream end in the conveying direction D1 (i.e., hexagon). Thus, a region where ink is thrown away is reduced and hence the risk that the platen 42 is stained by ejected ink and that an amount of ink mist increases can be further minimized.

In a case where the recording medium is a CD (compact disk) 149 as shown in FIG. 23B, an image 147 showing a substantially elliptic shape having a major axis running in the widthwise direction D2 may be recorded on the recording surface by the image recording unit 24.

In the above-described first through third embodiments, a borderless image is recorded on a recording sheet on a recording sheet by the multifunction device 10 according to the print data transferred from the terminal apparatus 70. However, borderless images of print data are not limited to such an image. For example, it may alternatively be configured that the control unit 100 generates print data according to the image data of the original document read by the scanner section 12 and performs borderless recording according to the print data. Still alternatively, it may be configured that the control unit 100 generates print data according to the image data obtained from a digital camera or a memory card and performs borderless recording according to the print data.

What is claimed is:

1. An image recording apparatus comprising:

an acquiring section that acquires print data indicative of an image having a size large enough to entirely cover a recording surface of a recording medium;

a recording section that is configured to form an image based on the print data over a print range including the recording medium such that the recording section records a borderless image on the recording medium while the recording medium is conveyed in a conveying direction, the recording medium having an upstream side and a downstream side with respect to the conveying direction; and a width setting section that sets width of the print range in a widthwise direction perpendicular to the conveying direction, the width of the print range increasing from the downstream side toward the upstream side in the conveying direction.

2. The image recording apparatus according to claim 1, further comprising:

a replacing section that replaces pixel data corresponding to both ends of the image in the widthwise direction with pixel data indicative of blank; and a decreasing section that decreases a number of pixels replaced by the replacing section from the downstream side toward the upstream side.

3. The image recording apparatus according to claim 2, wherein the replacing section replaces the pixel data on condition that at least one of a size of the recording medium, a type of the image indicated by the print data, a type of the recording medium, and a resolution of the image recorded on the recording medium satisfies a predetermined criterion.

4. The image recording apparatus according to claim 2, wherein the decreasing section changes a gradient of decreasing the number of pixels, based on at least one of a size of the recording medium, a type of the image indicated by the print data, a type of the recording medium, and a resolution of the image recorded on the recording medium.

5. The image recording apparatus according to claim 2, wherein the decreasing section changes a gradient of decreasing the number of pixels by changing a combination of a first pixel number, a second pixel number, and a replacement-region setting line number, the first pixel number being a number of pixels in the widthwise direction to be replaced by blank pixel data, the replacement-region setting line number being a number of lines in the conveying direction for which the pixel data are replaced by the blank pixel data for the first pixel number, the second pixel number being a number of pixels of the pixel data in the widthwise direction that is subtracted from the first pixel number after the pixel data of the first pixel number are replaced for the replacement-region setting line number in the conveying direction.

6. The image recording apparatus according to claim 1, wherein the recording section comprises a recording head that ejects ink droplets on the recording medium while being scanned in the widthwise direction; and wherein the width setting section increases the print range in the widthwise direction in which the recording head ejects ink droplets as a conveying amount increases, the conveying amount being a distance by which the recording medium is conveyed since the recording section starts recording.

7. The image recording apparatus according to claim 6, wherein the width setting section changes a gradient of expanding the print range in the widthwise direction, based on at least one of a size of the recording medium, a type of the image indicated by the print data, a type of the recording medium, a resolution of the image recorded on the recording medium, and the conveying amount.

8. The image recording apparatus according to claim 6, wherein the width setting section comprises:

a first coefficient setting section that sets at least one first coefficient based on at least one of a size of the recording medium, a type of the image indicated by the print data, a type of the recording medium, and a resolution of the image recorded on the recording medium;

a second coefficient setting section that sets a second coefficient based on the conveying amount;

a multiplying section that multiplies the at least one first coefficient and the second coefficient to obtain an ink ejection range in the widthwise direction;

a print executing section that executes printing for one pass in the widthwise direction and that conveys the recording medium for one linefeed amount in the conveying direction; and a repeating section that repeats operations of the second coefficient setting section, the multiplying section, and the print executing section until all the print data for the recording medium are processed.

9. The image recording apparatus according to claim 1, wherein the width setting section sets the width of the print range in such a manner that an image recorded by the recording section has a hexagonal shape produced by cutting off two corners of opposite ends in the widthwise direction at the upstream end in the conveying direction.

10. A method for recording an image, comprising:

acquiring print data indicative of an image having a size large enough to entirely cover a recording surface of a recording medium, the recording medium having an upstream side and a downstream side with respect to a conveying direction;

setting width of the image in a widthwise direction perpendicular to the conveying direction in such a manner that the width of the image increases from the downstream side toward the upstream side in the conveying direction, thereby modifying the print data; and forming an image based on the print data modified in the setting step over a print range including the recording medium to record a borderless image on the recording medium, while the recording medium is conveyed in the conveying direction.

11. The method according to claim 10, wherein the setting step comprises:

replacing pixel data corresponding to both ends of the image in the widthwise direction with pixel data indicative of blank; and decreasing a number of pixels that is replaced in the replacing step from the downstream side toward the upstream side.

12. The method according to claim 10, wherein the setting step comprises increasing the print range in the widthwise direction in which ink droplets are ejected as a conveying amount increases, the conveying amount being a distance by which the recording medium is conveyed since a start of recording on the recording medium.

13. A non-transitory computer readable storage medium storing a set of program instructions executable on an image recording apparatus, the set of program instructions comprising:

acquiring print data indicative of an image having a size large enough to entirely cover a recording surface of a recording medium, the recording medium having an upstream side and a downstream side with respect to a conveying direction;

setting width of the image in a widthwise direction perpendicular to the conveying direction in such a manner that the width of the image increases from the downstream side toward the upstream side in the conveying direction, thereby modifying the print data; and forming an image based on the print data modified in the setting step over a print range including the recording medium to record a borderless image on the recording medium based on the print data modified in the setting step, while the recording medium is conveyed in the conveying direction.

14. A non-transitory computer readable storage medium storing a printer driver including a set of program instructions executable on a computer, the set of program instructions comprising:

transferring print data to an image forming apparatus configured to perform a borderless recording on a recording medium;

generating image data indicative of an image; and generating the print data based on the image data, wherein the print data indicates an image having a size large enough to entirely cover the recording medium, and the borderless recording is performed based on the print data, such that the image indicated by the print data is printed over a print range including the recording medium, the generating instructions include:

replacing pixel data corresponding to both ends of the image in a widthwise direction with pixel data indicative of blank, the widthwise direction being orthogonal to a conveying direction in which the recording medium is conveyed; and decreasing a number of pixels that is replaced by the replacing instructions from the downstream side toward the upstream side in the conveying direction, such that the print range in the widthwise direction increases from the downstream side toward the upstream side in the conveying direction.

15. The non-transitory computer readable storage medium according to claim 14, wherein the replacing instructions comprise replacing the pixel data on condition that at least one of a size of the recording medium, a type of the image indicated by the print data, a type of the recording medium, and a resolution of the image recorded on the recording medium satisfies a predetermined criterion.

16. The non-transitory computer readable storage medium according to claim 14, wherein the decreasing instructions comprise changing a gradient of decreasing the number of pixels based on at least one of a size of the recording medium, a type of the image indicated by the print data, a type of the recording medium, and a resolution of the image recorded on the recording medium.

17. A non-transitory computer readable storage medium storing a printer driver including a set of program instructions executable on a computer, the set of program instructions comprising:

transferring print data to an image forming apparatus capable of performing a borderless recording on a recording medium;

generating image data indicative of an image having a size including a recording surface of the recording medium; and generating the print data based on the image data, the generating instructions include:

replacing pixel data corresponding to both ends of the image in a widthwise direction with pixel data indicative of blank, the widthwise direction being orthogonal to a conveying direction in which the recording medium is conveyed; and decreasing a number of pixels that is replaced by the replacing instructions from the downstream side toward the upstream side in the conveying direction, wherein the decreasing instructions comprise changing a gradient of decreasing the number of pixels based on at least one of a size of the recording medium, a type of the image indicated by the print data, a type of the recording medium, and a resolution of the image recorded on the recording medium.

* * * * *